(12) United States Patent
Tyler

(10) Patent No.: US 10,060,402 B2
(45) Date of Patent: Aug. 28, 2018

(54) INJECTOR VALVE

(71) Applicant: G.W. LISK COMPANY, INC., Clifton Springs, NY (US)

(72) Inventor: Jeff Tyler, Newark, NY (US)

(73) Assignee: G.W. LISK COMPANY, INC., Clifton Springs, NY (US)

(*) Notice: Subject to any disclaimer, the term of this patent is extended or adjusted under 35 U.S.C. 154(b) by 0 days.

(21) Appl. No.: 15/124,803

(22) PCT Filed: Mar. 10, 2015

(86) PCT No.: PCT/US2015/019665
§ 371 (c)(1),
(2) Date: Sep. 9, 2016

(87) PCT Pub. No.: WO2015/138425
PCT Pub. Date: Sep. 17, 2015

(65) Prior Publication Data
US 2017/0022953 A1    Jan. 26, 2017

Related U.S. Application Data

(60) Provisional application No. 61/950,361, filed on Mar. 10, 2014, provisional application No. 61/974,208, filed on Apr. 2, 2014.

(51) Int. Cl.
*F02M 61/18* (2006.01)
*F02M 51/06* (2006.01)
(Continued)

(52) U.S. Cl.
CPC .... *F02M 61/1806* (2013.01); *F02M 21/0254* (2013.01); *F02M 21/0272* (2013.01);
(Continued)

(58) Field of Classification Search
CPC ........... F02M 61/1806; F02M 21/0254; F02M 21/0272; F02M 51/0639; F02M 51/0642;
(Continued)

(56) References Cited

U.S. PATENT DOCUMENTS 3,001,757 A    9/1961 Ball
4,101,074 A    7/1978 Kiwior
(Continued)

FOREIGN PATENT DOCUMENTS

AT     502512 A4    4/2007
CN     100416087 A  10/2005
(Continued)

OTHER PUBLICATIONS

International Search Report for International Application No. PCT/US2015/019665 dated Jun. 4, 2015.
(Continued)

*Primary Examiner* — Christopher Kim
(74) *Attorney, Agent, or Firm* — Brown & Michaels, PC

(57) ABSTRACT

In some embodiments, the injector valves have additional flow holes in the seat face to reduce flow variation, decrease package size and allow for a fast response. In another embodiment, the injector valve has a seat with multiple flow channels leading to a venturi, allowing for a fast response and decreased package size.

2 Claims, 30 Drawing Sheets

(51) Int. Cl.
*F02M 21/02* (2006.01)
*F02M 61/20* (2006.01)

(52) U.S. Cl.
CPC .... *F02M 51/0639* (2013.01); *F02M 51/0642* (2013.01); *F02M 61/1853* (2013.01); *F02M 61/1873* (2013.01); *F02M 61/20* (2013.01); *F02M 2200/16* (2013.01); *F02M 2200/50* (2013.01); *Y02T 10/32* (2013.01)

(58) Field of Classification Search
CPC .......... F02M 61/1853; F02M 61/1873; F02M 61/20; F02M 2200/16; F02M 2200/50; Y02T 10/32
See application file for complete search history.

(56) References Cited

U.S. PATENT DOCUMENTS

| | | | |
|---|---|---|---|
| 4,519,370 A | 5/1985 | Iwata | |
| 5,417,373 A | 5/1995 | Facchin | |
| 5,971,300 A | 10/1999 | Coldren et al. | |
| 5,975,433 A | 11/1999 | Hasegawa et al. | |
| 6,027,050 A | 2/2000 | Rembold et al. | |
| 6,105,884 A | 8/2000 | Molnar et al. | |
| 6,382,533 B1 | 5/2002 | Mueller et al. | |
| 6,572,028 B1 | 6/2003 | Fly et al. | |
| 6,609,665 B2 | 8/2003 | Fukutomi et al. | |
| 6,739,525 B2 | 5/2004 | Dantes et al. | |
| 6,783,085 B2 | 8/2004 | Xu | |
| 6,789,752 B2 | 9/2004 | Dantes et al. | |
| 6,817,545 B2 | 11/2004 | Xu | |
| 6,848,635 B2 | 2/2005 | Xu | |
| 6,848,636 B2 | 2/2005 | Munezane et al. | |
| 6,908,050 B2 | 6/2005 | Sekine et al. | |
| 6,974,095 B2 | 12/2005 | Harata et al. | |
| 6,994,279 B2 | 2/2006 | Saito et al. | |
| 7,219,649 B2 | 5/2007 | Duffy et al. | |
| 7,222,407 B2 | 5/2007 | Sayar | |
| 7,299,997 B2 | 11/2007 | Sayar | |
| 7,306,172 B2 | 12/2007 | Sayar | |
| 7,344,090 B2 | 3/2008 | Sayar | |
| 7,383,812 B2 | 6/2008 | Katou et al. | |
| 7,448,560 B2 | 11/2008 | Sayar | |
| 7,464,886 B2 | 12/2008 | Landi | |
| 7,469,845 B2 | 12/2008 | Sayar | |
| 7,481,201 B2 | 1/2009 | Holzgrefe et al. | |
| 7,637,442 B2 | 12/2009 | Aoki et al. | |
| 8,328,121 B2 | 12/2012 | Irino et al. | |
| 2003/0136381 A1 | 7/2003 | Dantes et al. | |
| 2003/0178593 A1 | 9/2003 | Grytz | |
| 2005/0028365 A1 | 2/2005 | Dantes | |
| 2005/0284965 A1 | 12/2005 | Schneider | |
| 2006/0071103 A1 | 4/2006 | Stier | |
| 2007/0095947 A1 | 5/2007 | Sivieri | |
| 2008/0061171 A1 | 3/2008 | Bayer | |
| 2009/0200403 A1 | 8/2009 | Hung et al. | |
| 2009/0236448 A1 | 9/2009 | Burkhard et al. | |
| 2009/0309053 A1 | 12/2009 | Farrow et al. | |
| 2012/0261497 A1 | 10/2012 | Friedrichs | |
| 2012/0325922 A1 | 12/2012 | Sumida et al. | |
| 2014/0175195 A1 | 6/2014 | Vorbach | |

FOREIGN PATENT DOCUMENTS

| | | |
|---|---|---|
| DE | 10360253 A1 | 7/2005 |
| DE | 102014212562 A1 | 4/2015 |
| EP | 1561027 A1 | 8/2005 |
| EP | 1801410 A1 | 6/2007 |
| EP | 2302197 A1 | 3/2011 |
| EP | 2400193 A1 | 12/2011 |
| FR | 2876160 A1 | 4/2006 |
| WO | 03/031806 A1 | 4/2003 |
| WO | 2006111987 A1 | 10/2006 |
| WO | 2013018135 A1 | 2/2013 |

OTHER PUBLICATIONS

Supplementary European Search Report for International Application No. PCT/US2015/019665 dated Mar. 1, 2017.

INJECTOR VALVE

BACKGROUND OF THE INVENTION

Field of the Invention

The invention pertains to the field of injector valves. More particularly, the invention pertains to an injector valve with one or more holes in parallel series within a seat and in series with a hole downstream of the seat.

Description of Related Art

Typical port injectors utilize a single flow hole that requires a longer stroke injector. The longer actuation stroke reduces the potential response time of the injector which results in a dynamic flow control range reduction. In addition, the longer stroke requires significantly more power to actuate the valve to try and achieve response times required for injecting gas into the combustion engine cylinder.

Some fuel injectors use an additional disk with multiple bores to meter the fuel flowing through the injector. For example, U.S. Pat. No. 6,739,525 discloses a fuel injector with actuator for actuating a valve needle, the valve needle has a valve-closure member which forms a sealing seat together with a valve-seat surface formed on a valve-seat member. Fuel channels are provided in a valve needle guide, which is designed in one piece with or is connected to the valve-seat member. The fuel channels open into a swirl chamber. The number of fuel channels is such that a turbulent flow produced in the swirl chamber is homogeneous in a circumferential direction.

U.S. Pat. No. 6,789,752 disclose a fuel injector with a swirl disk upstream from a valve seat surface. The swirl disk is press fit into the valve seat. The swirl disk is provided with swirl channels from which, given an open fuel injector, the fuel flows with a circumferential speed into a swirl chamber which is also located upstream from the valve-seat surface, but within the valve seat. Each point downstream from the swirl disk through which a flow is to pass has a larger extension in every spatial direction than the diameter of the swirl channels.

One of the disadvantages of U.S. Pat. Nos. 6,739,525 and 6,789,752 is that each of the fuel channels requires an individual seal, which increases the costs of manufacturing. Furthermore, the independent seals around each flow hole exit cause a variation in height from one exit port to another, which causes the armature lift to have to be longer in order to compensate for this variation.

SUMMARY OF THE INVENTION

In some embodiments, the injector valves have additional flow holes in the seat face to reduce valve stroke, decrease package size and allow for a fast response.

In another embodiment, the injector valve has a seat with multiple flow channels leading to a venturi, allowing for a fast response, decreased package size, and reduced flow variation.

DETAILED DESCRIPTION OF THE INVENTION

Figure 1:
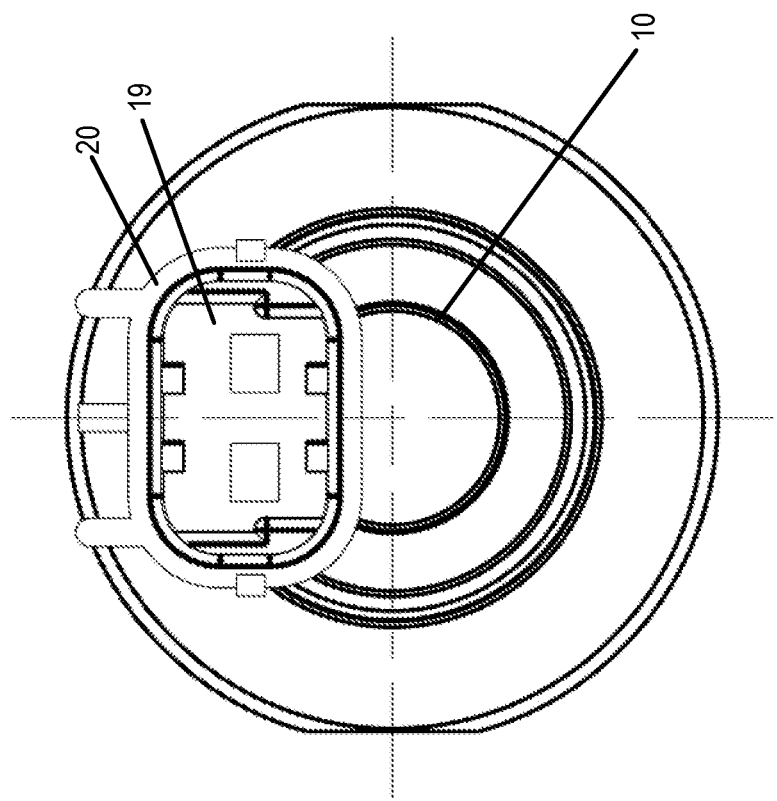
FIG. 1 shows a top view of an injector valve of a first embodiment.

The injector valves of the embodiments of the invention provide a fast response time or preferably a stroke time of approximately one millisecond or less in comparison to prior art or current injector valves with a single flow hole in the valve seat of the same flow equivalence.

Combustion engines having one or more cylinders inject fuel at varying frequencies and varying duty cycles. The injection frequency is a function of engine revolutions per minute (RPM) as the crank shaft rotates the pistons in the cylinders and the number of pistons the engine has. At idle, the crank shaft may typically rotate at 450-550 rpm and at rated conditions, the crank shaft may typically rotate at 1800-2200 rpm, depending on engine conditions and loads. The injection frequency is tied to the rpm of the crank shaft of the engine and the number of cylinders. The intake cycle of the cylinder has a defined time in which fuel can be injected for combustion. Also, within a maximum injection time period, the time the valve is open can be controlled and varied to optimize the amount of fuel that gets injected into the cylinder. Therefore, the faster the response time of the injector injecting fuel, the more control over the amount of fuel injected.

The injector valves of embodiments of the invention improve flow dynamic range by varying the valve open time during operation to control the amount of flow exiting the valve when commanded at different duty cycles by the engine control unit (ECU).

With the improvement to flow dynamic range, there is an increase in flow variation since there are multiple flow holes or channels present in the seat. An orifice downstream of the valve seat may be used to reduce the flow variance outputted from the injector valve.

The injector valves of FIGS. 1-18 and 25-38 are preferably used for applications which require the injector valves not to be sensitive to large differential pressure changes. The injector valve of FIGS. 19-24 may be used for applications where the differential pressure does not vary significantly. The injector valve of FIGS. 19-24 may also be used for applications which may require a smaller package size. The injector valve of FIGS. 19-24 also has half the stroke of the injector valve of FIGS. 10-18 and therefore, the life cycle of the injector valve of FIGS. 19-24 is approximately twice as long.

It should be noted that FIGS. 3, 12, 21, 26 and 31 all show the injector valve with the solenoid assembly in a de-energized state. Arrows present within these figures show the flow of fluid as if the solenoid were in an energized state.

FIGS. 1-9 show an injector valve of a first embodiment of the invention. The injector valve is mounted within the engine using a mounting plate (not shown) and includes a cartridge body 1 which receives a solenoid assembly 10 and a valve assembly 15. The solenoid assembly 10 has at least one coil 21 connected to a power source (not shown), and a bobbin 39. The armature 5, while a moving portion of the solenoid assembly 10, is not located within the same bore of the cartridge body 1 as the bobbin 39 and at least one coil 21. The valve assembly 15 includes a valve seat 4 with one set of flow holes 30.

Figure 2:
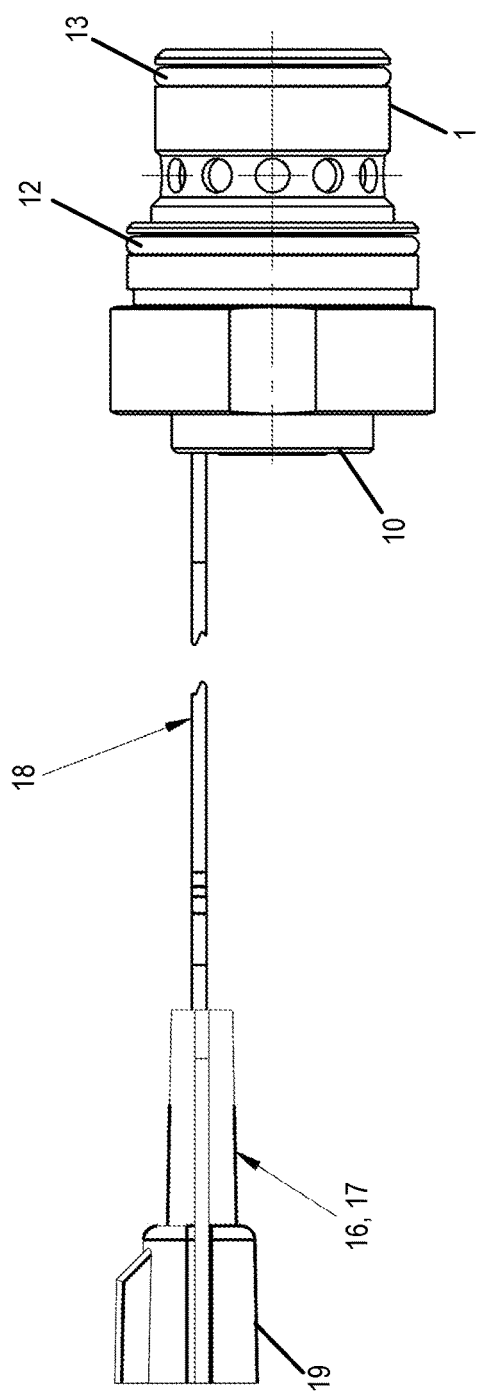
FIG. 2 shows a side view of the injector valve of the first embodiment and some of its connections.
Figure 3:
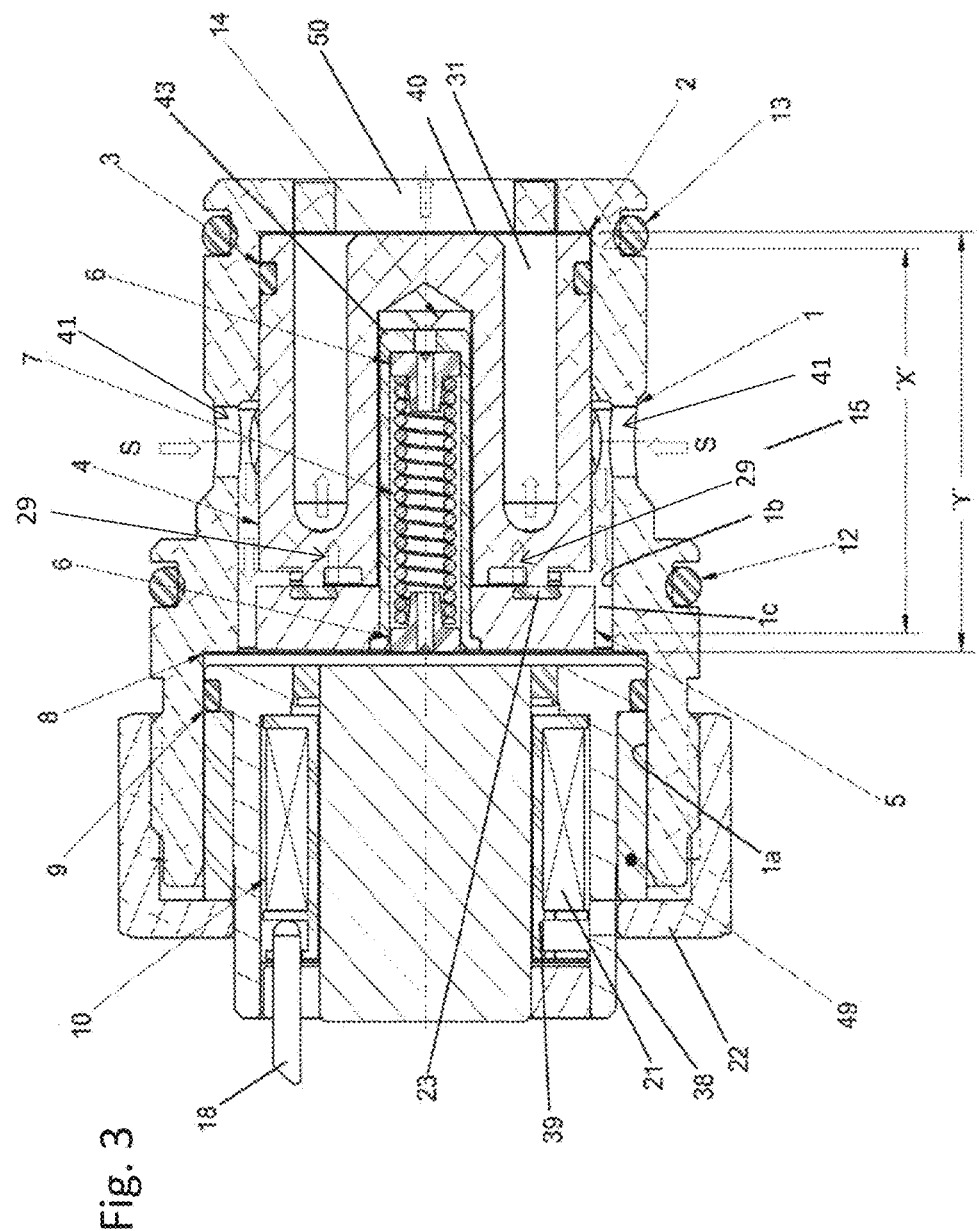
FIG. 3 shows a cut through view of the injector valve of the first embodiment.

Referring to FIG. 3, the cartridge body 1 has a first bore 1a and a second bore 1b. The first bore 1a of the cartridge body 1 receives a tubular casing 38 that surrounds at least one coil of conductive material 21 wrapped around a bobbin 39 and electrically coupled to and energized by an electric or power source (not shown) through electrical conductors 18, a cable seal (not shown), power terminal 16, 17 and connector 19 as shown in FIGS. 1-2. The connection to the power source may be secured in place through a lock 20. A retainer 49 and retainer housing 22 secure the solenoid assembly 10 within the first bore 1a of the cartridge body 1.

An o-ring seal 9 and retainer 49 seal the tubular casing 38 and the solenoid assembly 10 within the first bore 1a of the cartridge body 1. A built-in residual air gap 40 is present between the tubular casing 38, the cartridge body 1, and the armature 5. Shim(s) 8 are present between the armature 5 and tubular casing 38. In an alternate embodiment, a center spring disc made out of a non-magnetic or slightly magnetic material may be used as a shim to keep the armature 5 centered versus utilizing the bearing 43.

Figure 5:
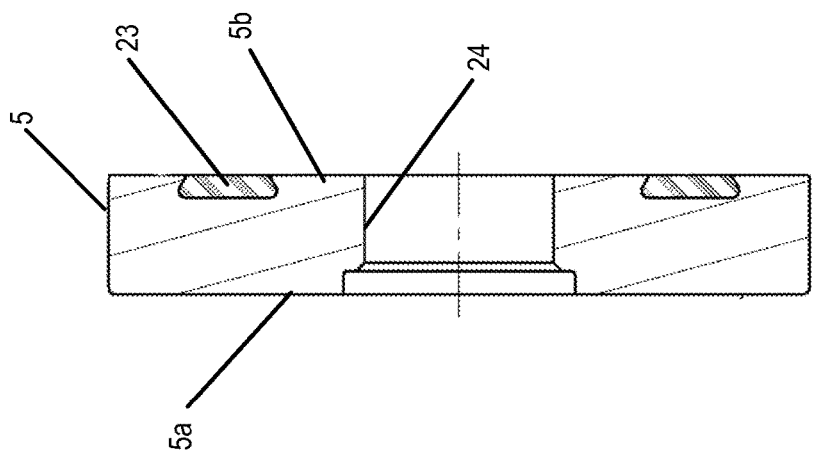
FIG. 5 shows a section of the armature of the injector valve along line 5-5 of FIG. 4.
Figure 4:
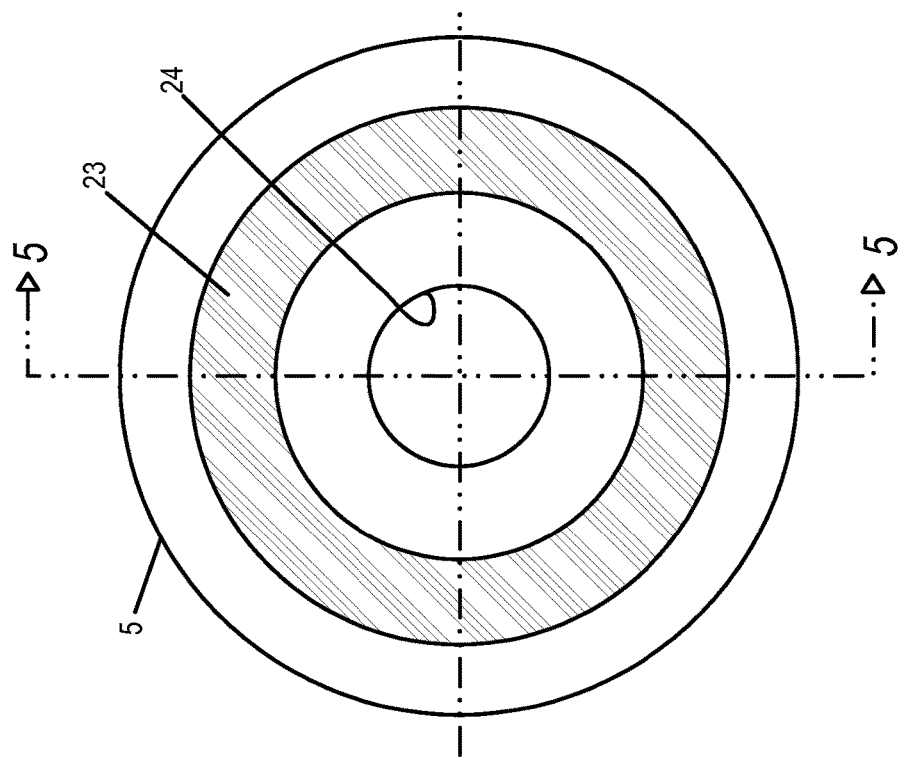
FIG. 4 shows a front view of an armature of the injector valve of the first embodiment.
Figure 7:
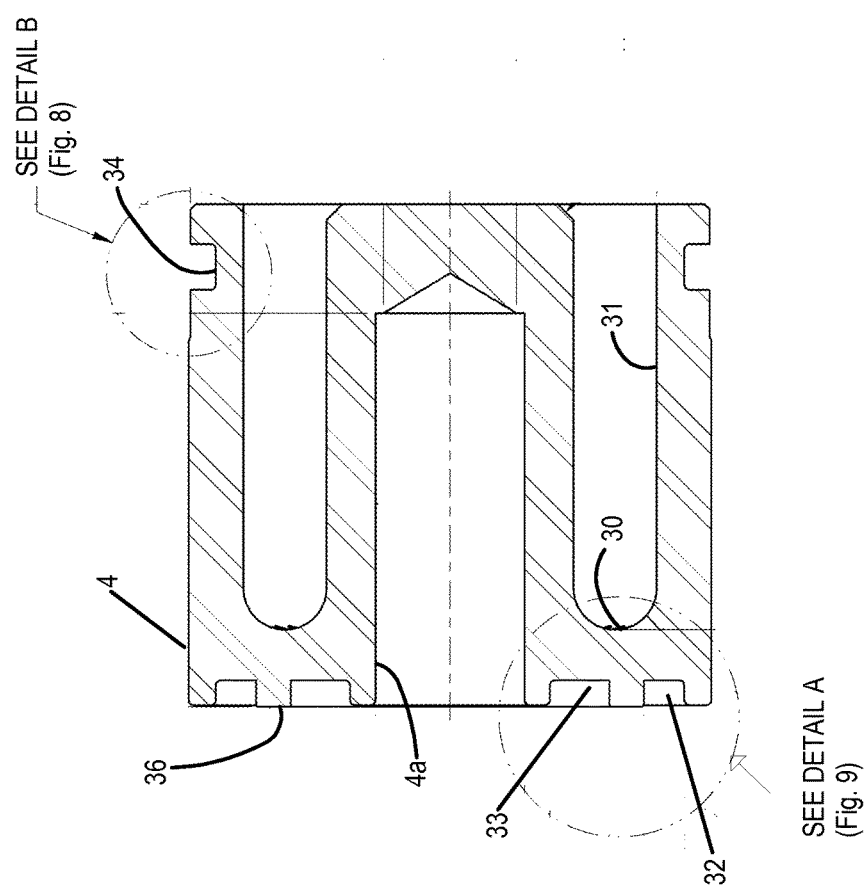
FIG. 7 shows a cut through view of the seat of the injector valve of the first embodiment.

Within the second bore 1b of the cartridge body 1 is an armature 5. Referring to FIGS. 3-5, the armature 5 has a through bore 24 for receiving a bearing 43 extending from a first face 5a to a second face 5b. The bearing 43 contains a spring 7 with spring retainers 6 on either end of the spring 7. A seal insert 23 is present on a second face 5b of the armature 5 to reduce leakage and block the flow of fluid to a set of holes 30 in the valve seat 4 when in the spring biased closed position.

The armature 5 is preferably formed of a ferromagnetic material and functions as a moving part of the solenoid assembly 10. The armature 5 is subject to flux generated by one or more coils 21 of conductive material wrapped around a bobbin 39 and electrically coupled to an electrical energy source through connections. The armature 5 is actuated when the one or more coils 21 are energized by the electrical energy source. The movement of the armature 5 is guided within the second bore 1b of the cartridge body 1. The linear movement of the armature 5 is limited by the valve seat 4 and the solenoid assembly 10. The distance in which the armature 5 can travel is the stroke distance and is shown as the difference between X and Y on FIG. 3.

The bearing 43 is also received within a bore 4a of the valve seat 4. The bore 4a may be lined with a core liner 14, which may be made of polytetrafluoroethylene (PTFE), which is available from DuPont under the trademark Teflon®.

Figure 6:
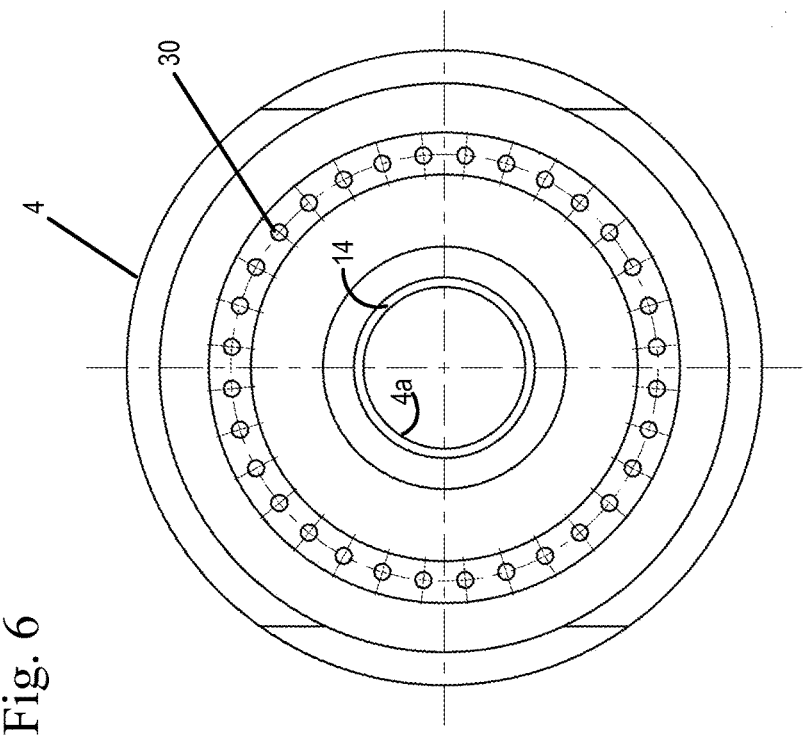
FIG. 6 shows a front view of a seat of the injector valve of the first embodiment.
Figure 9:
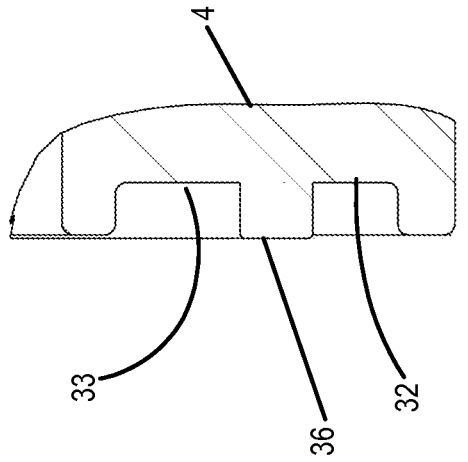
FIG. 9 shows an enlarged view of the circled portion of FIG. 7 labeled "Detail B".
Figure 8:
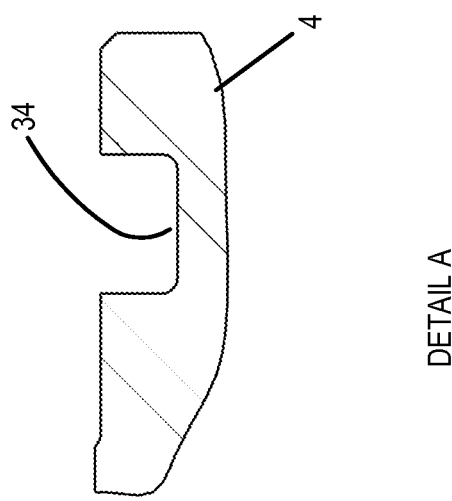
FIG. 8 shows an enlarged view of the circled portion of FIG. 7 labeled "Detail A".

Referring to FIGS. 6-9, the valve seat 4 has an inlet side and an outlet side. Seat flow passages 32 and 33 connect the seat face 36 on the inlet side to a seat channels 29, which extend through the valve seat 4 to a set of flow holes or channels 30 on the outlet side 31 of the valve seat 4. The set of flow holes 30 are preferably arranged around the valve seat 4 as shown in FIG. 6. Individual flow holes of the set of flow holes 30 may be arranged such that they are equally spaced and extend around the entire circumference of the seat face. Within the set of holes, the holes may vary in size or shape.

The flow holes 30 provide a large flow capacity within a short stroke, allowing the valve to have an actuation response time of approximately one millisecond or less. A seal 3 is placed in a notch 34 of the valve seat 4 to eliminate any leakage between the cartridge body 1 and the valve seat 4 from exiting the valve. A shim 2 may be present between the valve seat 4 and the second bore 1b of the cartridge body 1 to reduce stroke variation due to tolerance stack up from manufacturing processes which results in lower performance variation and valve to valve variation from high production manufacturing.

When the solenoid assembly 10 is energized, the armature 5 overcomes the force of the spring 7 and inlet pressure received through an inlet passage 41 from a pressurized source S moves towards the solenoid assembly 10, such that the armature 5 moves away from the valve seat 4. The movement of the armature 5 away from the valve seat 4, opens a flow path from the fuel inlet passage 1c to the flow passage 32, 33 in the valve seat 4. From the flow passages 32, 33, fluid flows to the set of holes 30 in the valve seat 4, out the set of holes 30 in the valve seat 4, through the valve seat outlet 31 and through a valve outlet 40. An orifice 50 may be present on the valve outlet 40 or downstream from the valve outlet 40 to reduce the flow variation and provide better flow accuracy. The arrows in FIG. 3 show fluid flow that would occur only when the solenoid assembly 10 is energized and the armature 5 has been moved such that fluid is not blocked by the seal insert 23.

When the solenoid assembly 10 is de-energized, the biasing force of the spring 7 and inlet pressure from pressurized source S returns the armature 5 to its original position. In the armature's original position, the seal insert 23 seals off and blocks the flow of fluid from fuel inlet passage 1c to the set of flow holes 30 in the valve seat 4. It should be noted that single seal insert 23 seals multiple holes 30 of the valve seat 4.

O-rings 12, 13 are present on an outer surface of the cartridge body 1 to aid in sealing the valve when the valve is mounted to the engine.

FIGS. 10-18 show an injector valve of a second embodiment of the invention. The injector valve may for example be approximately 2.52 inches long with the largest diameter of the valve having a diameter of 1.63 inches and a smaller diameter of 1.18 inches.

The injector valve is mounted within the engine using a mounting plate 140 and includes a cartridge body 101 which receives a solenoid assembly 110 and a valve assembly 150. The solenoid assembly 110 has at least one coil 121 connected to a power source (not shown), a bobbin 139 and an armature 105. The valve assembly 150 includes a valve seat 104 with at least two sets of flow holes 130, 136.

Figure 10:
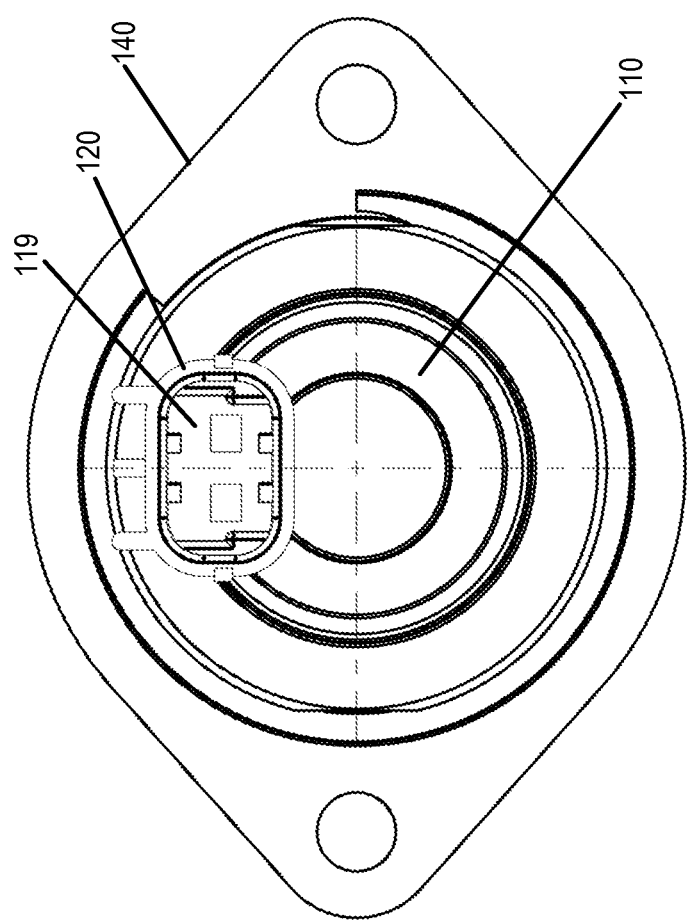
FIG. 10 shows a top view of an injector valve of a second embodiment.
Figure 11:
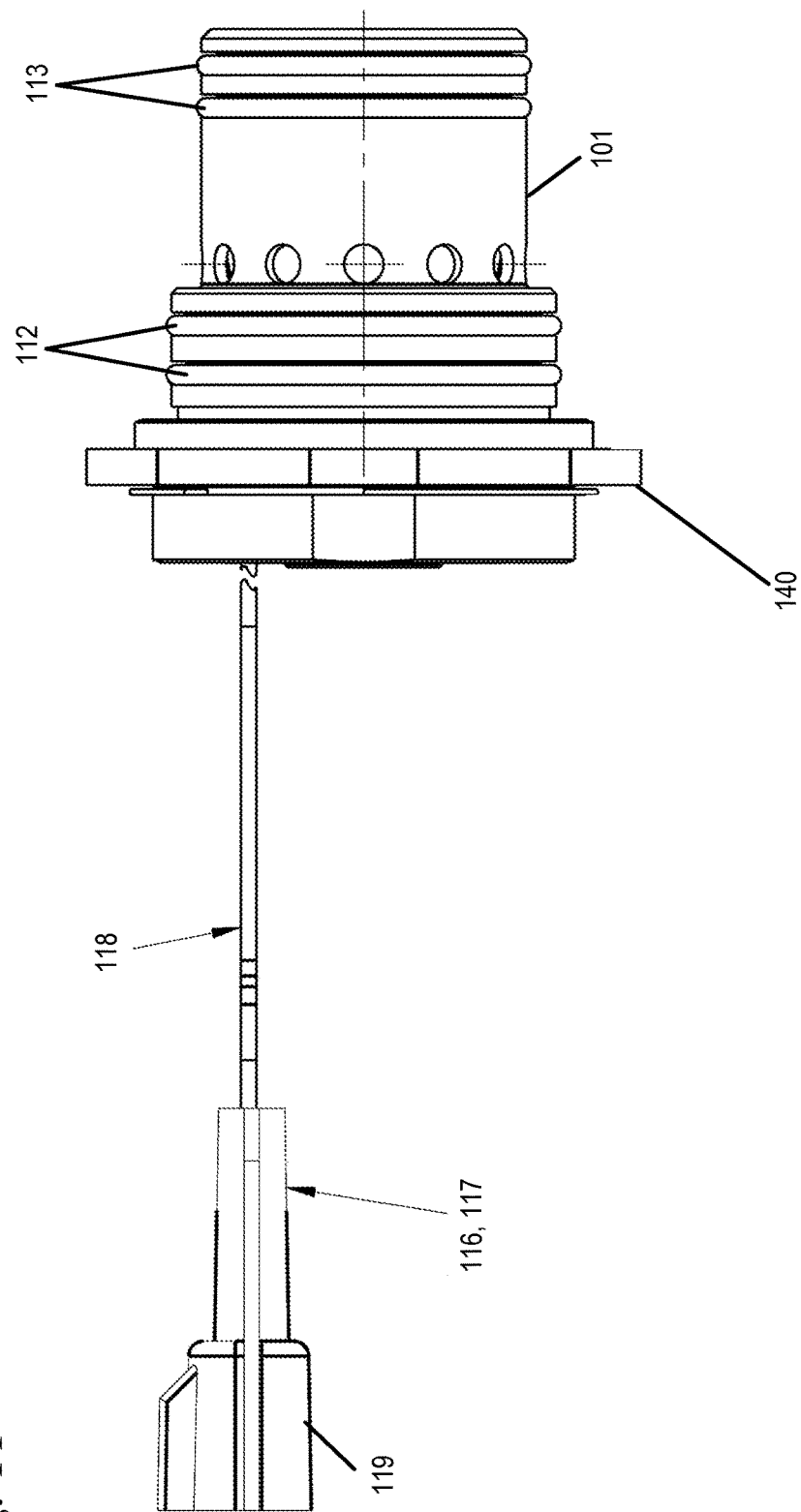
FIG. 11 shows a side view of the injector valve of the second embodiment and some of its connections.
Figure 12:
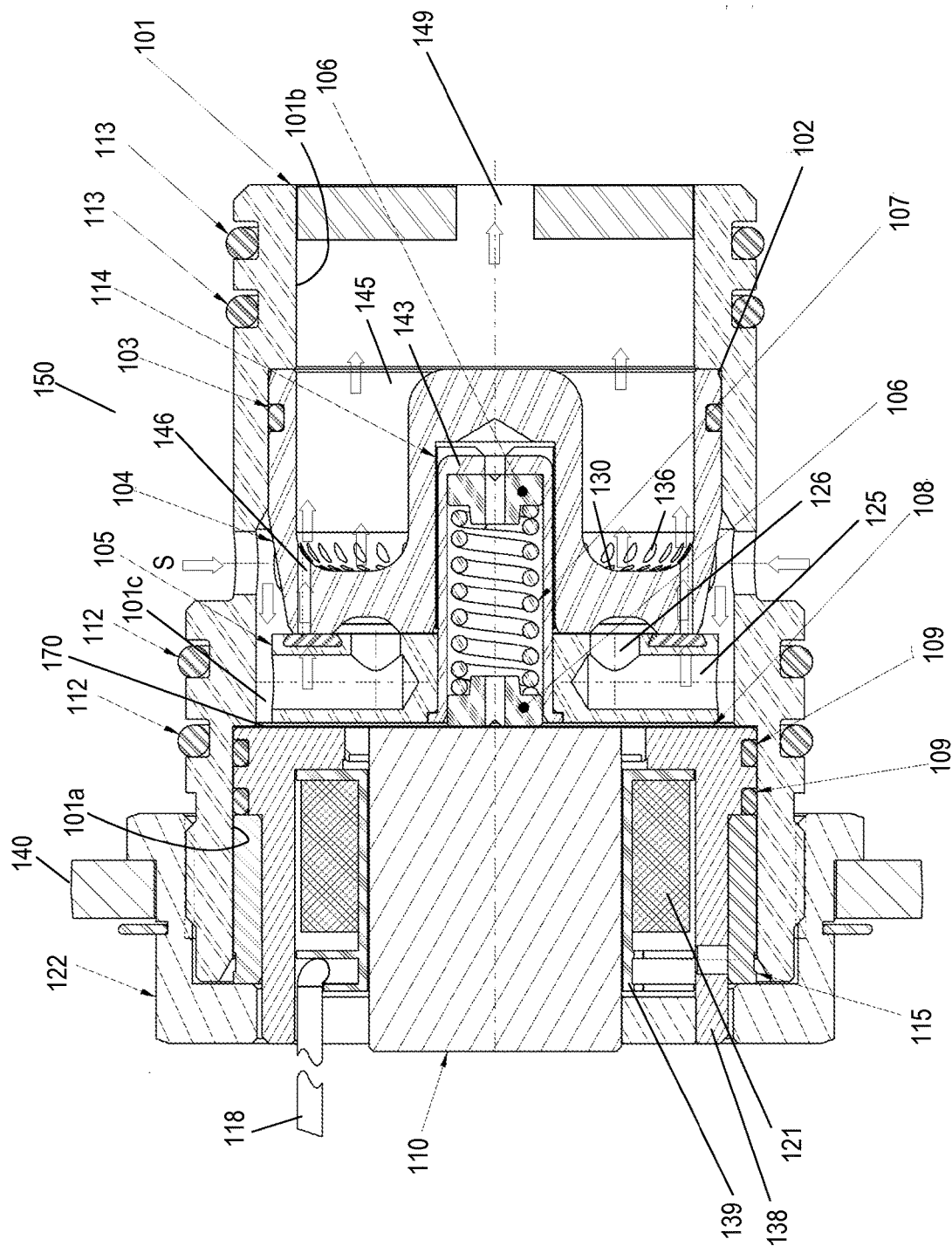
FIG. 12 shows a cut through view of the injector valve of the second embodiment.
Figure 14:
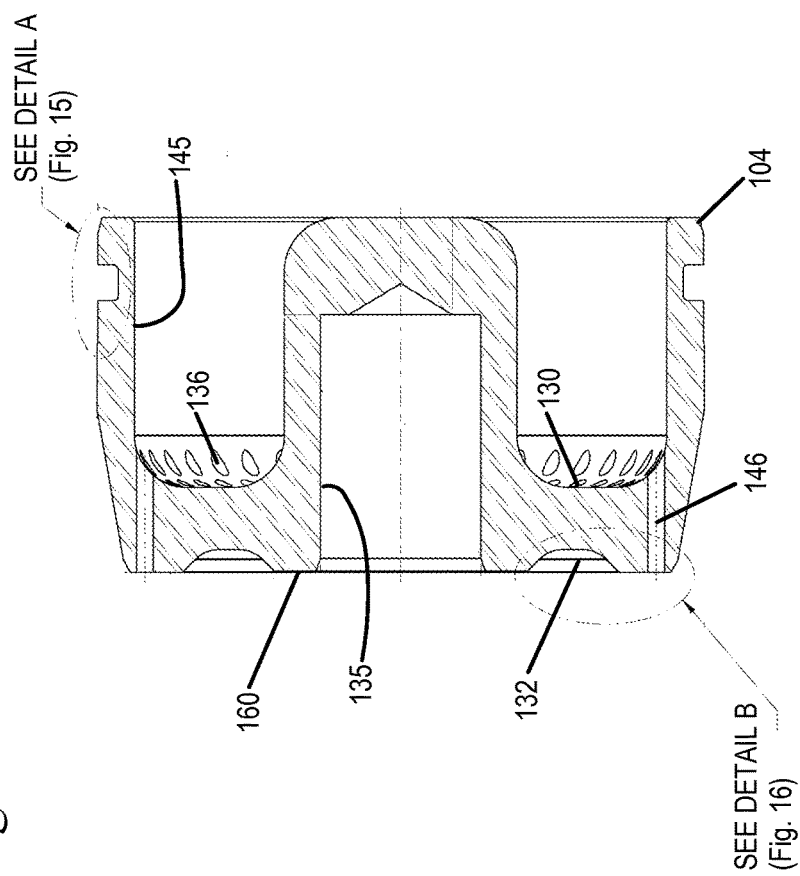
FIG. 14 shows a cut through view of the seat of the injector of the second embodiment.
Figure 13:
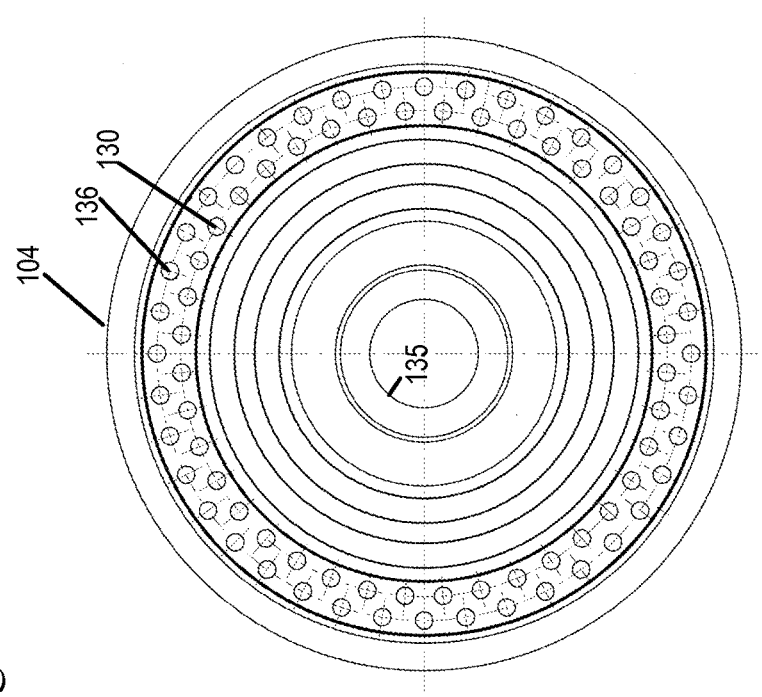
FIG. 13 shows a front view of a seat of the injector of the second embodiment.
Figure 16:
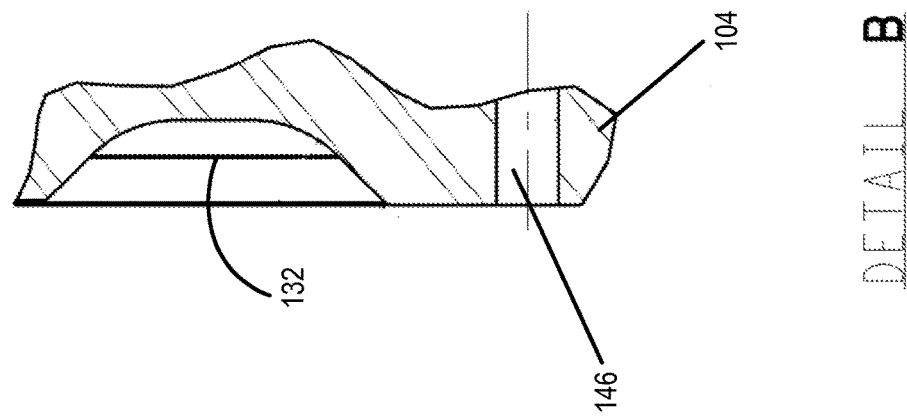
FIG. 16 shows an enlarged view of the circled portion of FIG. 14 labeled "Detail B".
Figure 15:
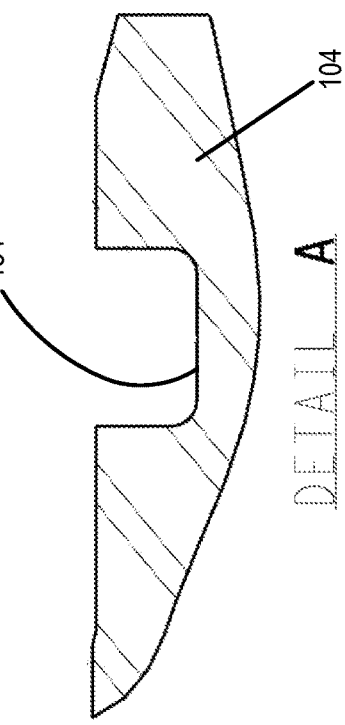
FIG. 15 shows an enlarged view of the circled portion of FIG. 14 labeled "Detail A".

Referring to FIG. 12, the cartridge body 101 has a first bore 101a and a second bore 101b. The first bore 101a of the cartridge body 101 receives a tubular casing 138 that surrounds at least one coil 121 of conductive material wrapped around a bobbin 139 and electrically coupled to and energized by an electric or power source (not shown) through electrical conductors 118, a cable seal (not shown), power terminal 116, 117 and connector 119 as shown in FIGS. 10-11. The connection to the power source may be secured in place by a lock 120. A retainer housing 122 secures the solenoid assembly 110 within the first bore 101a of the cartridge body 101.

O-ring seals 109, a tube 115, and the tubular casing 138 seal the solenoid assembly 110 within the first bore 101a of the cartridge body 101. A built-in residual air gap 170 is present between the tubular casing 138, the cartridge body 101, and the armature 105. Shim(s) 108 are present between the armature 105 and the tubular casing 138.

Figure 18:
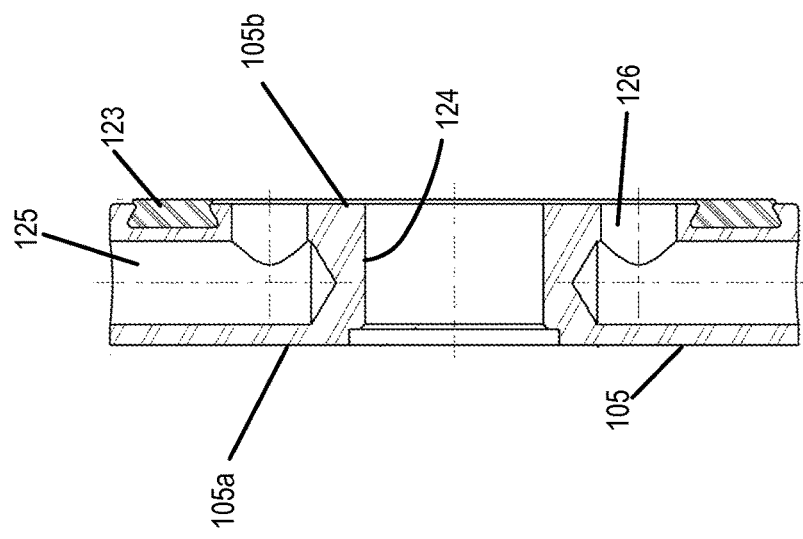
FIG. 18 shows a section of FIG. 17 along line 18-18.
Figure 17:
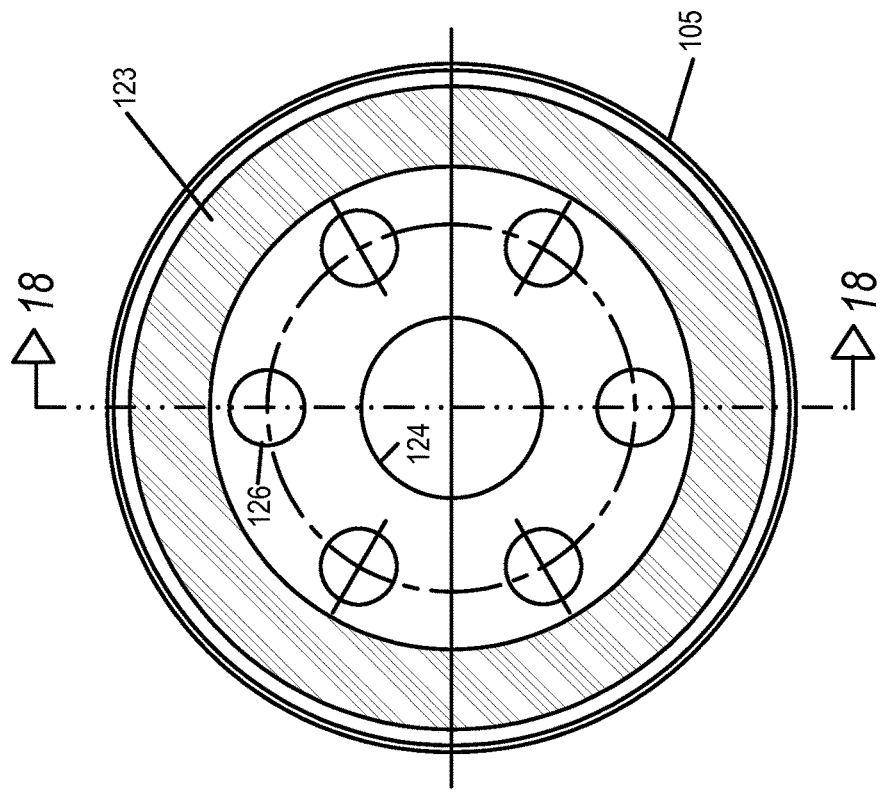
FIG. 17 shows a cut through view of the armature of the injector of the second embodiment.
Figure 19:
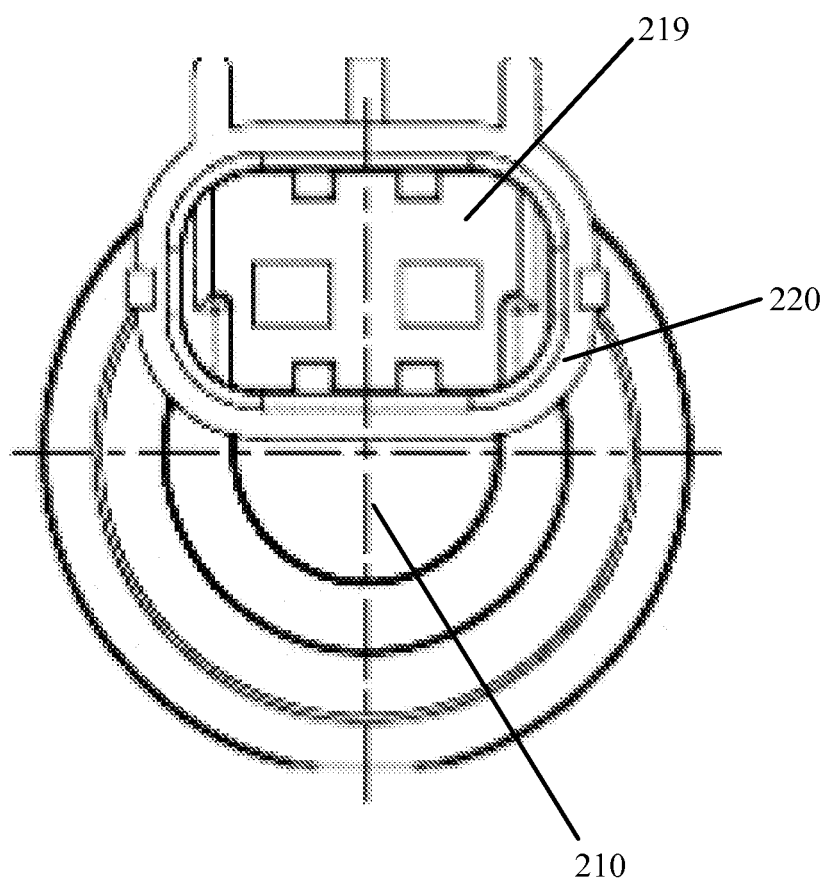
FIG. 19 shows a schematic of a top view of an injector valve of a third embodiment.

Within the second bore 101b of the cartridge body 101 is an armature 105, adjacent the shim 108. The armature 105 has a through bore 124 for receiving a bearing 143 extending from a first face 105a to a second face 105b. The bearing 143 contains a spring 107 with spring retainers 106 on either end of the spring 107. Referring to FIGS. 12 and 17-18, the armature 105 also has inlet flow channels 125 connected to flow passages 126. The inlet flow channels 125 are in fluid connection with inlet passage 101c connected to the pressurized source S. A seal insert 123 is present on the second face 105b of the armature 105 to reduce leakage and block the flow of fluid from inlet passage 101c to seat flow passage 146, leading to a second set of flow holes 136, when the armature 105 is in a spring biased closed position.

The armature 105 is preferably formed of a ferromagnetic material and functions as a moving part of the solenoid assembly 110. The armature 105 is subject to flux generated by one or more coils 121 of conductive material wrapped around a bobbin 139 and electrically coupled to an electrical energy source (not shown) through connections. The armature 105 is actuated when the one or more coils 121 are energized by the electrical energy source. The movement of the armature 105 is guided within the second bore 101b of the cartridge body 101. The linear movement of the armature 105 is limited by the valve seat 104 and the solenoid assembly 110. The distance in which the armature 105 can travel is the stroke distance.

The bearing 143 is also received within a bore 135 of the valve seat 104. The bore 135 may be lined with a core liner 114, which may be made of polytetrafluoroethylene (PTFE), which is available from DuPont under the trademark Teflon®.

Referring to FIGS. 13-16, the valve seat 104 has an inlet side and an outlet side. A first seat flow passage 132 and a second seat flow passage 146 connect the valve seat face 160 to at least a first set of flow holes 130 and a second set of flow holes 136 respectively on an outlet side of the valve seat 104. The first and second set of flow holes 130, 136 are in fluid communication with a seat flow outlet 145 and an orifice 149 at an end of the second bore 101b of the cartridge body 101. The first set and second set of flow holes 130, 136 are preferably arranged around the valve seat 104 in parallel, with the first set of the flow holes 130 offset from the second set of flow holes 136. The first set of holes 130 may be of a different size than the second set of holes 136. Other arrangements of the holes and other geometry than that shown in drawings may also be used. It should be noted that the pressure force at 100 psid is approximately 4.24 lbs on the valve seat 104, with the spring load of spring 107 providing the highest percentage of force at 8.5 lbs nominal. The valve stroke is 0.009 nominal.

A first seat flow passage 132 is present in the valve seat 104 connecting flow passages 126 of the armature 105 to the first set of holes 130, when the solenoid has been energized and the armature 105 has been moved, such that the seal insert 123 no longer blocks the flow passages 126. A second seat flow passage 146 is formed between the seat 104 and the fuel inlet passage 101c and connects the inlet passage 101c to the second set of flow holes 136 when the solenoid has been energized and the armature 105 has been moved, such that the seal insert 123 no longer blocks the second seat flow passage 146 and flow passage 126 from the fuel inlet passage 101c. The flow holes 130, 136 provide a large flow capacity within a short stroke, allowing the valve to have actuation time of approximately one millisecond or less.

O-rings 103 are placed in a notch 134 of the valve seat 104 to eliminate internal leakage. A shim(s) 102 may be present between the valve seat 104 and the second bore 101b of the cartridge body 101 to reduce stroke variation due to tolerance stack up from manufacturing processes which results in lower performance variation and valve to valve variation from high production manufacturing.

Fluid from a pressurized source S is provided to a fuel inlet passage 101c of the cartridge body 101 and the fluid moves through the passage 101c to the second set flow passage 146 that is formed between the valve seat 104 and fuel inlet passage 101c. Additionally, fluid from a pressurized source S and fuel inlet passage 101c flows into the flow channel 125 and the flow passages 126 of the armature assembly 105 to the first flow passages 132 of the valve seat 104. From the first and second seat flow passages 132, 146, the fluid flows through the first and second set of holes 130, 136 in the valve seat 104, out the first and second set of holes 130, 136 and to the valve seat flow outlet 145. From the valve seat flow outlet 145, the fluid exits the valve. The fluid may exit the valve through an orifice 149 downstream of the valve seat outlet 145 to provide better flow accuracy.

When the solenoid assembly 110 is energized, the armature 105 overcomes the force of the spring 107 and inlet pressure from a pressurized source S, and moves towards the solenoid assembly 110, such that the armature 105 moves away from the seat 104. A flow path is present between the fuel inlet passage 101c to the flow channels 125 and flow passages 126 of the armature 105. Fluid flows from the flow passage 126 to the seat flow passages 132, connected to the first flow holes 130 in the seat 104. The movement of the armature 105 away from the seat 104 also opens a flow path from the fuel inlet passage 101c to the second seat flow passage 146 that is formed between the seat 104 and the fuel inlet passage 101c, connecting the inlet passage 101c to the second set of flow holes 136 of the valve seat 104. From the first and second holes 130, 136 of the valve seat 104, fluid exits the valve through a valve seat outlet 145. It should be noted that by allowing fluid to flow through two sets of holes in parallel the flow capacity of the valve is increased within a single stroke of the armature 105. This helps in maintaining the response time of the valve with a high required flow capacity. An orifice 149 may be present on the outlet 145 or downstream to reduce the flow variation further.

When the solenoid assembly 110 is de-energized, the biasing force of the spring 107 returns the armature 105 to its original position. In the armature's original position, the seal insert 123 seals off and blocks the flow of fluid from the flow passages 126 in the armature 105 to the seat flow passages 132 in the valve seat 104 and the first set of flow holes 130. The seal insert 123 also seals and blocks off the flow of fluid from the fuel inlet passage 101c to the second seat flow passage 146 and the second set of flow holes 136.

O-rings 112 and 113 are present on an outer surface of the cartridge body 101 to aid in sealing the valve when mounting the valve to the engine.

In another embodiment of the invention, the injector valve shown in FIGS. 19-24 provides a fast response time or preferably a stroke time of approximately one millisecond or less in comparison to prior art or current injector valves with a single flow hole in the valve seat of the same flow equivalence. The injector valve of this embodiment has a smaller package than the injector valves of FIGS. 1-18. The injector valve of FIGS. 19-24 may for example be approximately 2.3 inches long with the largest diameter of the valve having a diameter of 1.35 inches and a smaller diameter of 0.94 inches.

With the improvement to flow dynamic range in the injector valve of the invention, there is an improvement in flow variation since the seat has multiple channels which direct flow to a venturi at the outlet or exit of the valve.

As fluid flows through a venturi 246, the expansion and compression of the fluids cause the pressure inside the venturi 246 to change. When a fluid flows through the venturi 246 that narrows to a smaller diameter, the partial restriction causes a higher pressure at the inlet than a pressure at the narrow end. This pressure difference causes the fluid to accelerate toward the low pressure narrow section, in which it thus maintains a higher speed at Mach 1 or greater.

The injector valve is mounted within the engine using a mounting plate (not shown) and includes a cartridge body 201 which receives a solenoid assembly 210 and a valve assembly 215. The solenoid assembly 210 has at least one coil 221 connected to a power source (not shown), a bobbin 239 and an armature 205. The valve assembly 215 includes a cartridge body 201 with multiple ports 241 which direct flow through channels 242 of a valve seat 204 through the valve seat outlet 247 and into a venturi 246 and to a flow outlet 230 of the injector valve. The venturi 246 has a length and a diameter that varies along that length.

Referring to FIGS. 19-22, the cartridge body 201 has a first bore 201a with a first diameter, a second bore 201b with a second diameter and a third bore 201c with a third diameter. The first bore 201a of the cartridge body 201 receives a tubular casing 238 that surrounds at least one coil 221 of conductive material wrapped around a bobbin 239 and electrically coupled to and energized by an electric or power source (not shown) through electrical conductors 218, a cable seal (not shown), power terminal 216, 217 and connector 219. The connection to the power source may be secured through a lock 220. A retainer 249 secures the solenoid assembly 210 within the first bore 201a of the cartridge body 201. A retainer housing 222 surrounds the cartridge body 201.

An O-ring seal 209 seals the tubular casing 238 and the solenoid assembly 210 within the first bore 201a of the cartridge body 201. Shim(s) 208 may be present between the armature 205 and the solenoid assembly 210. The core of the solenoid assembly has a bore 224 that receives a spring 207 and a spring retainer 206 on ends of the spring 207. The other end of the spring 207 and corresponding spring retainer 206 is received within closed bore 224 and a closed end bore 205c of the armature 205. The armature 205 rides in bore 201b which may be lined with a core liner 214, which may be made of polytetrafluoroethylene (PTFE), which is available from DuPont under the trademark Teflon®.

The armature 205 has a first face 205a and a second face 205b. The first face 205a of the armature 205 has a closed end bore 205c for receiving one of the spring retainers 206 and a portion of the spring 207. The second face 205b receives a seal insert 223, which reduces leakage and blocks the flow of fluid to the venturi 246 when the armature 205 is biased to a closed position by spring 207.

The armature 205 is preferably formed of a ferromagnetic material and functions as a moving part of the solenoid assembly 210. The armature 205 is subject to flux generated by one or more coils 221 of conductive material wrapped around a bobbin 239 and electrically coupled to an electrical energy source through connections. The armature 205 is actuated when the one or more coils 221 are energized by the electrical energy source. The movement of the armature 205 is guided within the second bore 201b of the cartridge body 201. The linear movement of the armature 205 is limited by the valve seat 204 and the solenoid assembly 210.

Figure 20:
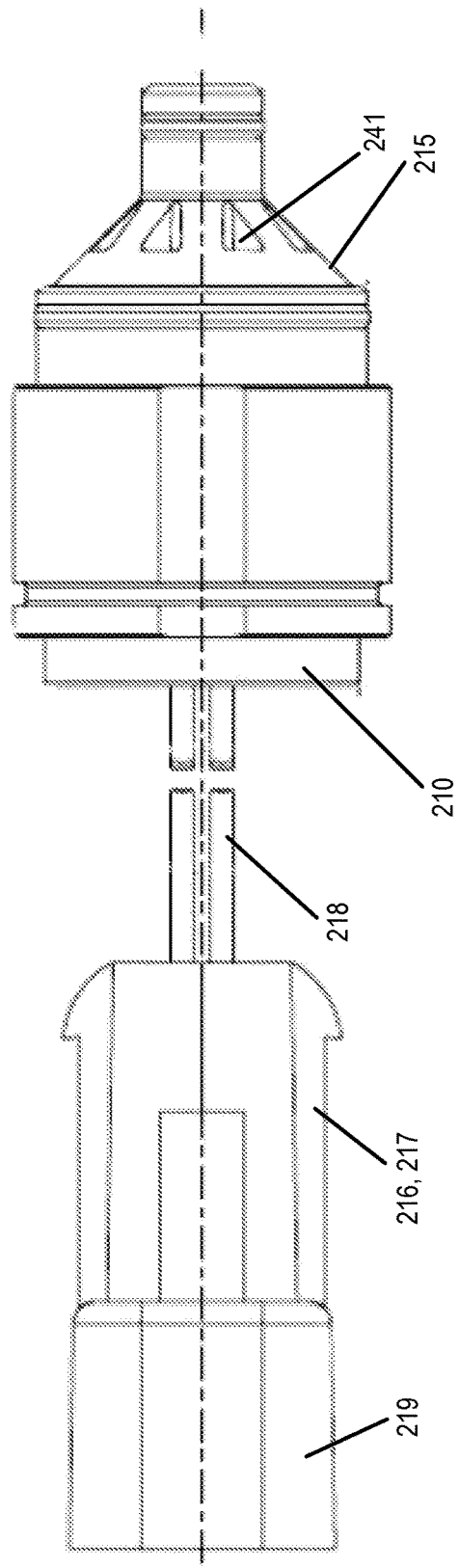
FIG. 20 shows a side view of the injector valve of the third embodiment and some of its connections.
Figure 21:
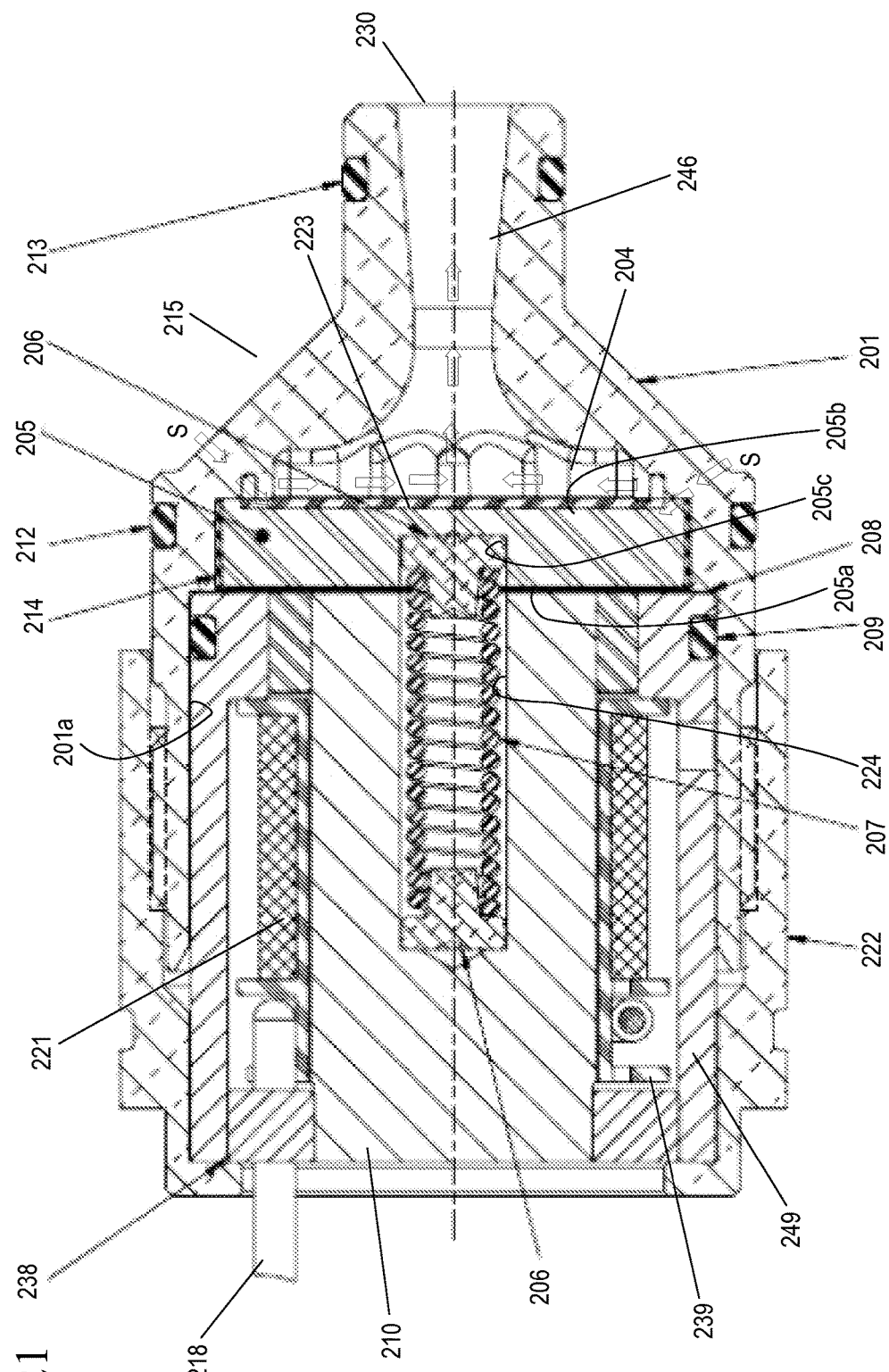
FIG. 21 shows a cut through view of the injector valve of the third embodiment.
Figure 22:
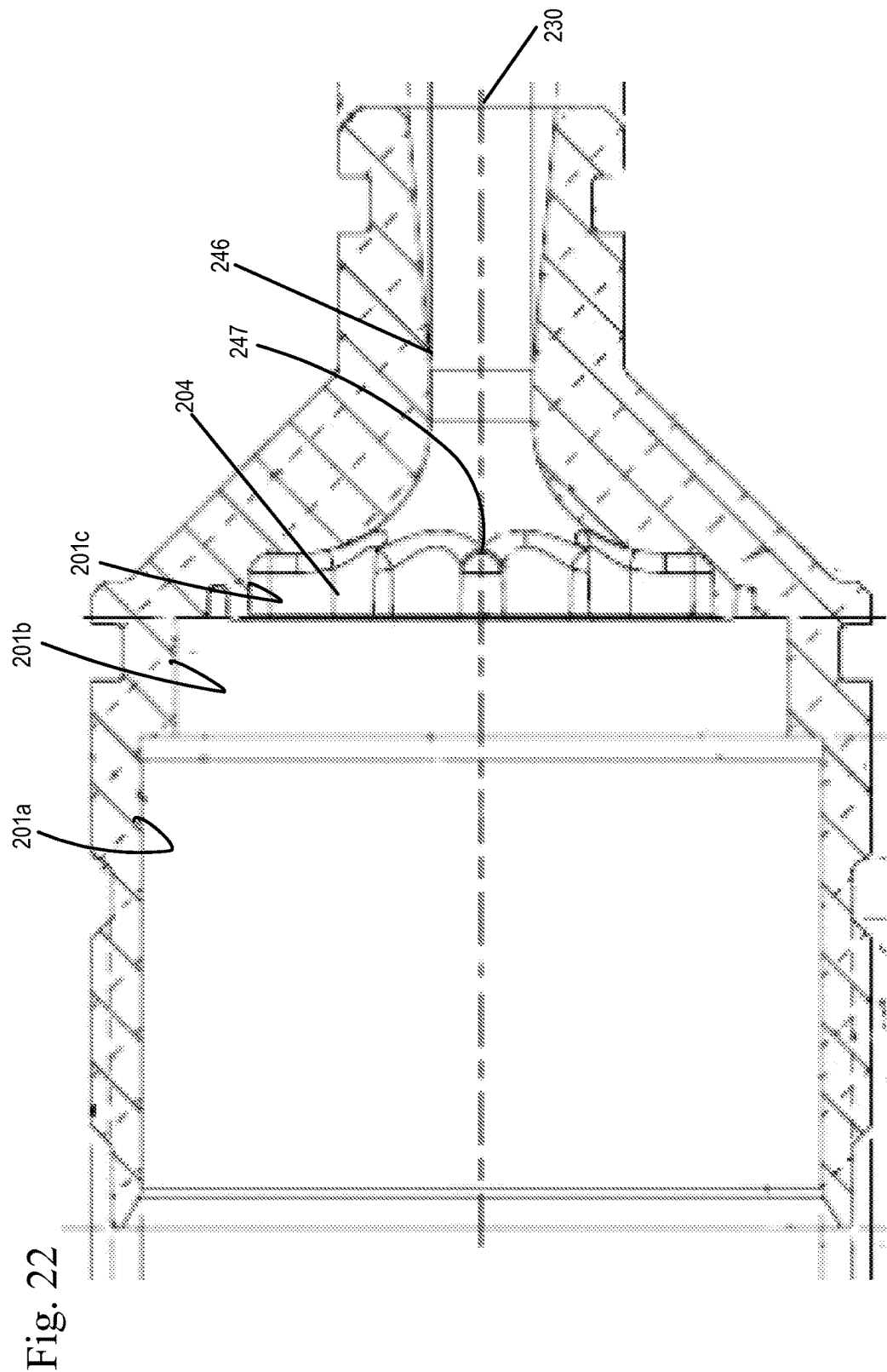
FIG. 22 shows a cut through view of the valve seat and the cartridge body of the third embodiment.
Figure 23:
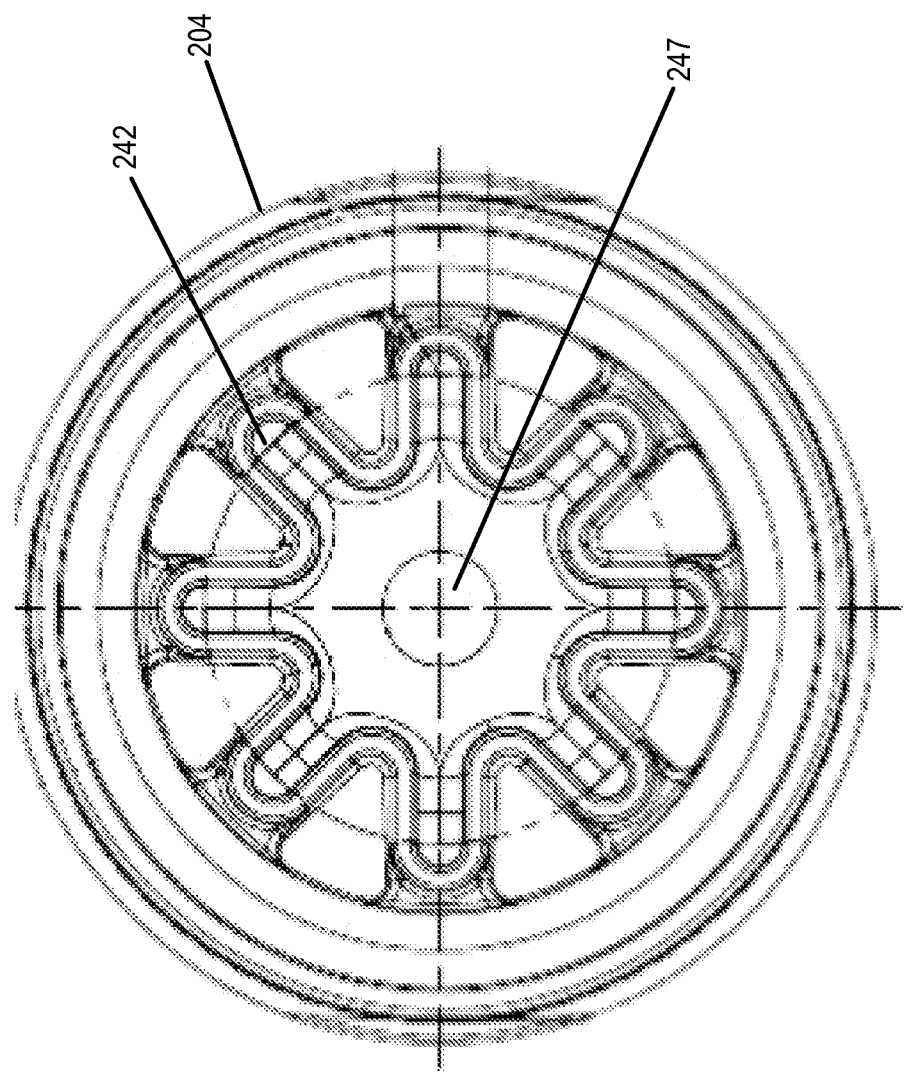
FIG. 23 shows a view of the outlet face of the valve seat of the injector valve of the third embodiment.

A valve seat 204 is received within a third bore 201c of the cartridge body 201. The cartridge body 201 has multiple ports 241 which direct flow from a pressurized source S, to the valve seat 204 through channels 242, through the valve seat outlet 247 on the outlet side of the valve seat 204 and downstream into a venturi 246 and to a valve outlet 230 to exit the injector valve. The venturi 246 has a length and a diameter that varies along that length as shown in FIGS. 20 and 21. The channels 242 are formed on the inlet side surface or face of the valve seat 204 adjacent to the armature 205.

Figure 24:
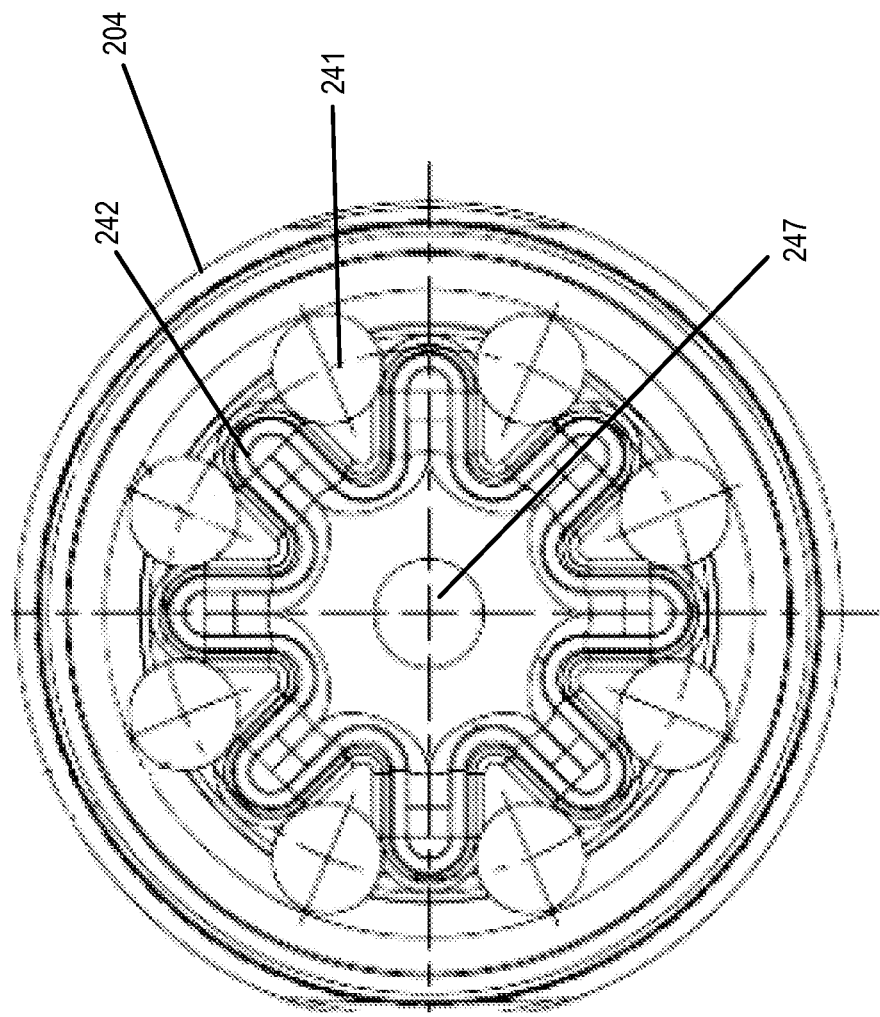
FIG. 24 shows a view of the inlet face of the valve seat of the injector valve of the third embodiment.

The channels 242 are preferably radially arranged on the inlet side surface or face of the seat around a center point similar to spokes around a wheel center as shown in FIG. 24. Alternatively, the channels may form a cross, a slot, a star, a square or other geometries. The multiple ports 241 may all be the same size as shown in FIG. 20 or may vary in size and/or shape. Similarly, the channels 242 may also be the same size and shape or vary in size and/or shape.

The combination of the multiple ports 241, the channels 242, and the venturi 246 minimizes the flow variation and provide a large flow capacity within a short stroke, allowing the valve to have an actuation response time of approximately one millisecond or less.

It should be noted that the pressure force at 100 psid is approximately 25.5 lbs on the valve seat, which makes up the majority of the force. The valve stroke is 0.004 in nominal.

Fluid from a pressurized source S is provided to the multiple ports 241 of the cartridge body 201. From the multiple ports 241, the fluid moves to the multiple channels 242 of the valve at the perimeter of the valve seat 204, through the valve seat 204 and out through the valve seat outlet 247 and through the venturi 246 downstream of the seat 204, and to the flow outlet 230 as indicated by the arrows when the armature 205 is energized by solenoid 210. From the seat flow outlet 230, the fluid exits the valve. The arrows in FIG. 21 show fluid flow that would occur only when the solenoid assembly 210 is energized and the armature 205 has been moved such that fluid is not blocked by the seal insert 223 at the seat entrance of the planar surfaces of the flow channels 242.

When the solenoid assembly 210 is energized, the armature 205 overcomes the force of the spring 207 and pressurized source S. The armature 205 moves towards the solenoid assembly 210, such that the armature 205 moves away from the valve seat 204. The movement of the armature 205 away from the valve seat 204, opens a flow path from supply from a pressurized source S to the channels 242 at the perimeter of the valve seat 204 and to the venturi 246 downstream of the valve seat 204. From the venturi 246, fluid flows to the seat flow outlet 230. The flow through the venturi minimizes the flow variation by maintaining the flow of the fluid exiting the valve in a sonic region equal to Mach 1 or greater.

When the solenoid assembly 210 is de-energized, the biasing force of the spring 207 returns the armature 205 to its original position. In the armature's original position, the seal insert 223 seals off and blocks the flow of fluid from the pressurized source S from the multiple ports 241 and multiple channels 242 in the seat 204. O-rings 212, 213 are present on an outer surface of the cartridge body 201 to aid in sealing the valve when the valve is mounted to the engine.

FIGS. 25-29 shows an injector valve of another embodiment. The injector valve has a package size that is similar to the injector valve of FIGS. 10-18. The injector valve of FIGS. 25-29 has additional flow holes, which allow for an even shorter stroke for faster speed. The additional flow holes also allow for a greater flow capacity out of the valve.

The injector valve is mounted within the engine using a mounting plate 340 and includes a cartridge body 301 which receives a solenoid assembly 310 and a valve assembly 315. The solenoid assembly 310 has at least one coil 321 connected to a power source (not shown), a bobbin 339 and an armature 305. The valve assembly 315 includes a valve seat 304 and a plate 350 with at least three sets of flow holes 361a, 361b, 361c.

Figure 25:
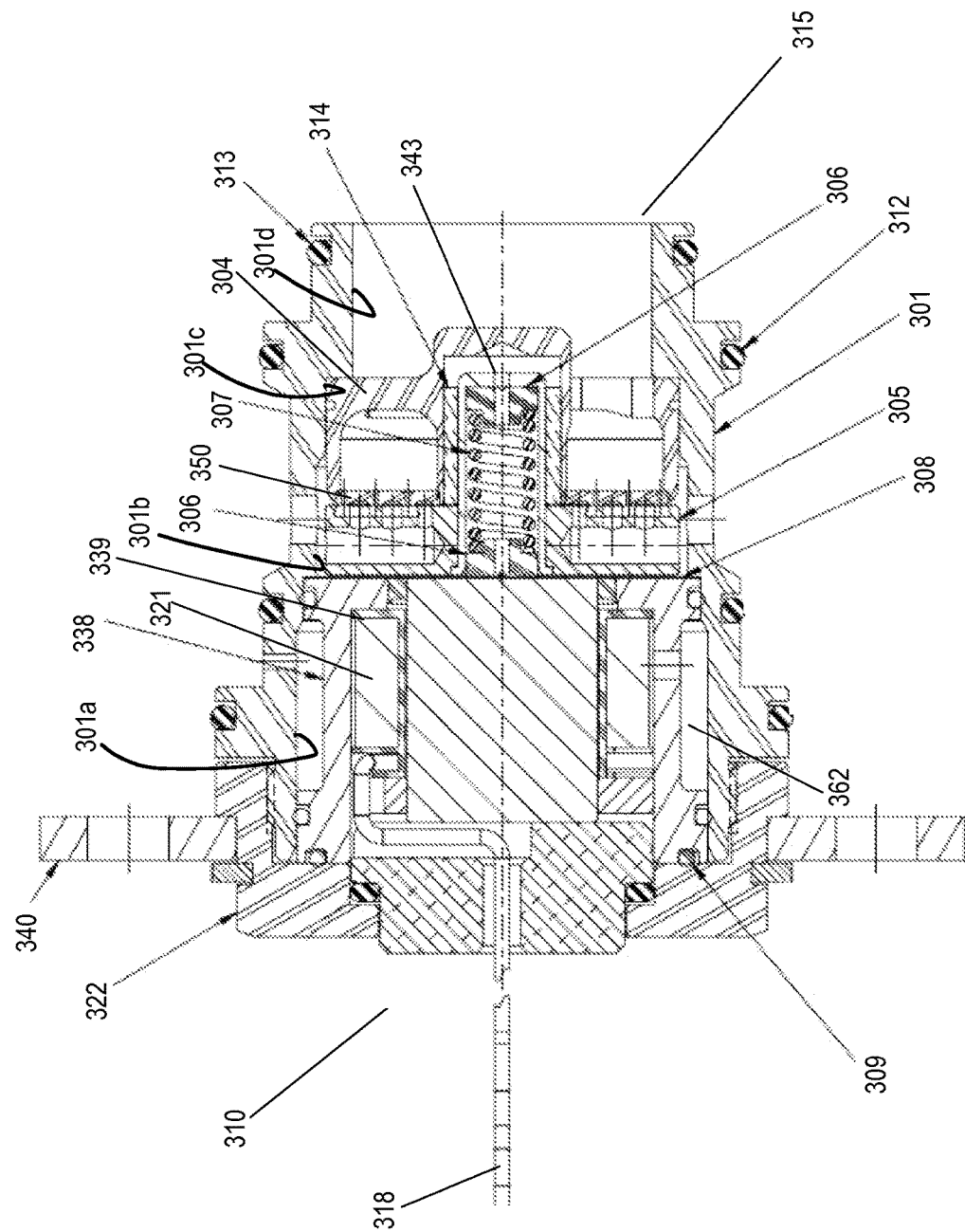
FIG. 25 shows a cut through view of an injector valve of a fourth embodiment

Referring to FIG. 25, the cartridge body 301 has a first bore 301a, a second bore 301b, a third bore 301c, and a fourth bore 301d. The fourth bore 301d forms the outlet of the injector valve. The first bore 301a of the cartridge body 301 receives a tubular casing 338 that surrounds at least one coil 321 of conductive material wrapped around a bobbin 339 and electrically coupled to and energized by an electric or power source (not shown) through electrical conductors 318, a cable seal (not shown), power terminal (not shown) and connector (not shown). The connection to the power source may be secured in place by a lock. A retainer housing 322 secures the solenoid assembly 310 within the first bore 301a of the cartridge body 301.

O-ring seals 309, a tube 362, and the tubular casing 338 seal the solenoid assembly 310 within the first bore 301a of the cartridge body 301. A built-in residual air gap is present between the tubular casing 338, the cartridge body 301, and the armature 305. Shim(s) 308 may be present between the armature 305 and the solenoid assembly 310.

Within the second bore 301b of the cartridge body 301 is an armature 305, adjacent a shim 308. The armature 305 is preferably formed of a ferromagnetic material and functions as a moving part of the solenoid assembly 310. The armature 305 is subject to flux generated by one or more coils 321 of conductive material wrapped around a bobbin 339 and electrically coupled to an electrical energy source (not shown) through connections. The armature 305 is actuated when the one or more coils 321 are energized by the electrical energy source. The movement of the armature 305 is guided within the second bore 301b of the cartridge body 301. The linear movement of the armature 305 is limited by the valve seat 304 and the solenoid assembly 310. The distance in which the armature 105 can travel is the stroke distance and may be, for example 0.005 inches.

Figure 26:
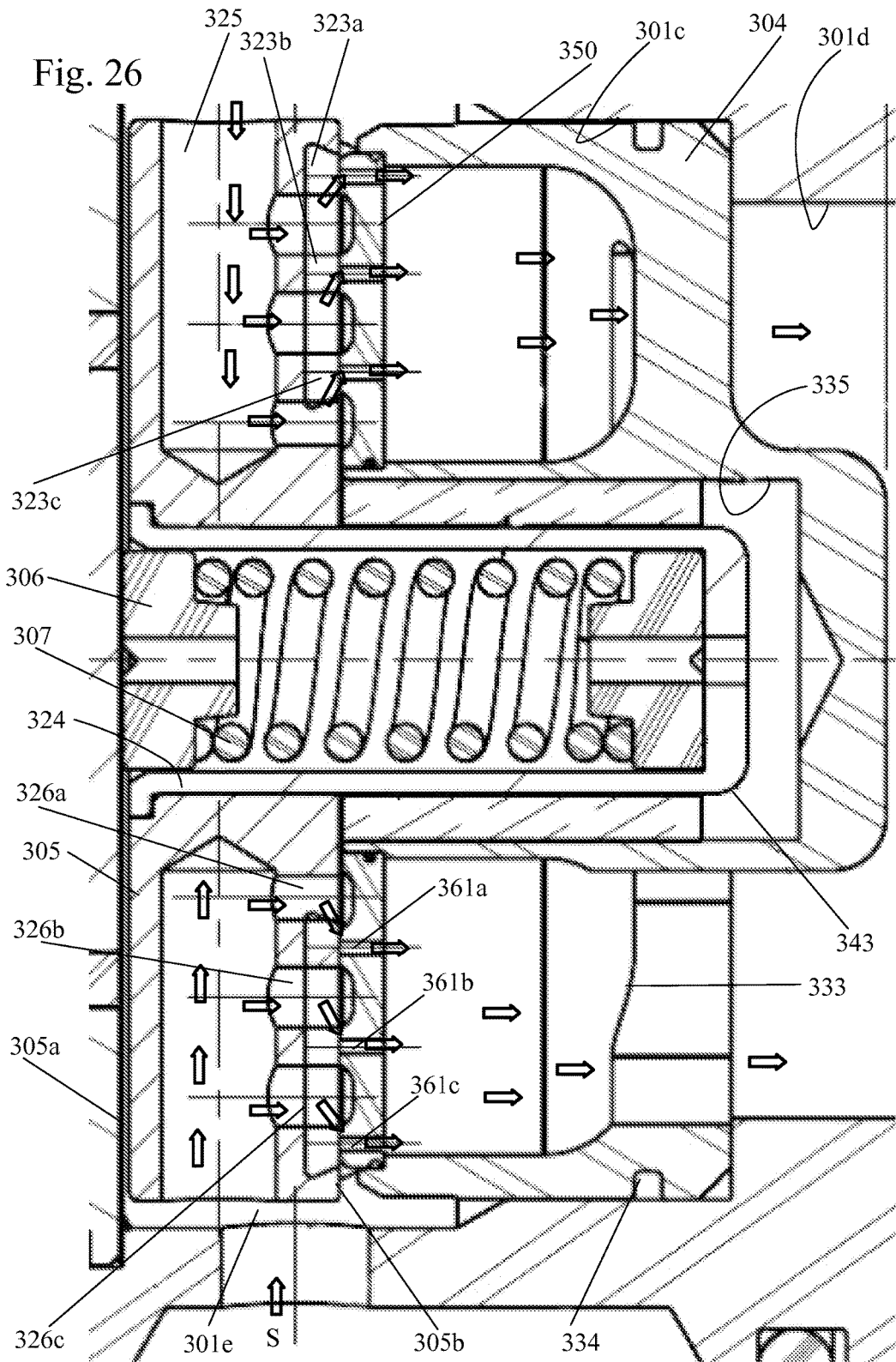
FIG. 26 shows an enlarged view of the armature and the valve seat of FIG. 25.

Referring to FIG. 26, the armature 305 has a first face 305a, a second face 305b and inlet flow channels 325 connected to flow passages 326a, 326b, 326c. The inlet flow channels 325 are in fluid connection with inlet passage 301e connected to the pressurized source S. A seal insert 323a, 323b, 323c is present on the second face 305b of the armature 305. The seal insert 323a, 323b, 323c reduces leakage and blocks the flow of fluid from inlet passage 301e to plate flow holes 361a, 361b, 361c of the valve seat 304, when the valve is spring biased closed.

Additionally, the armature 305 also has a through bore 324 for receiving a bearing 343. The bearing 343 contains a spring 307 with spring retainers 306 on either end of the spring 307.

Figure 27:
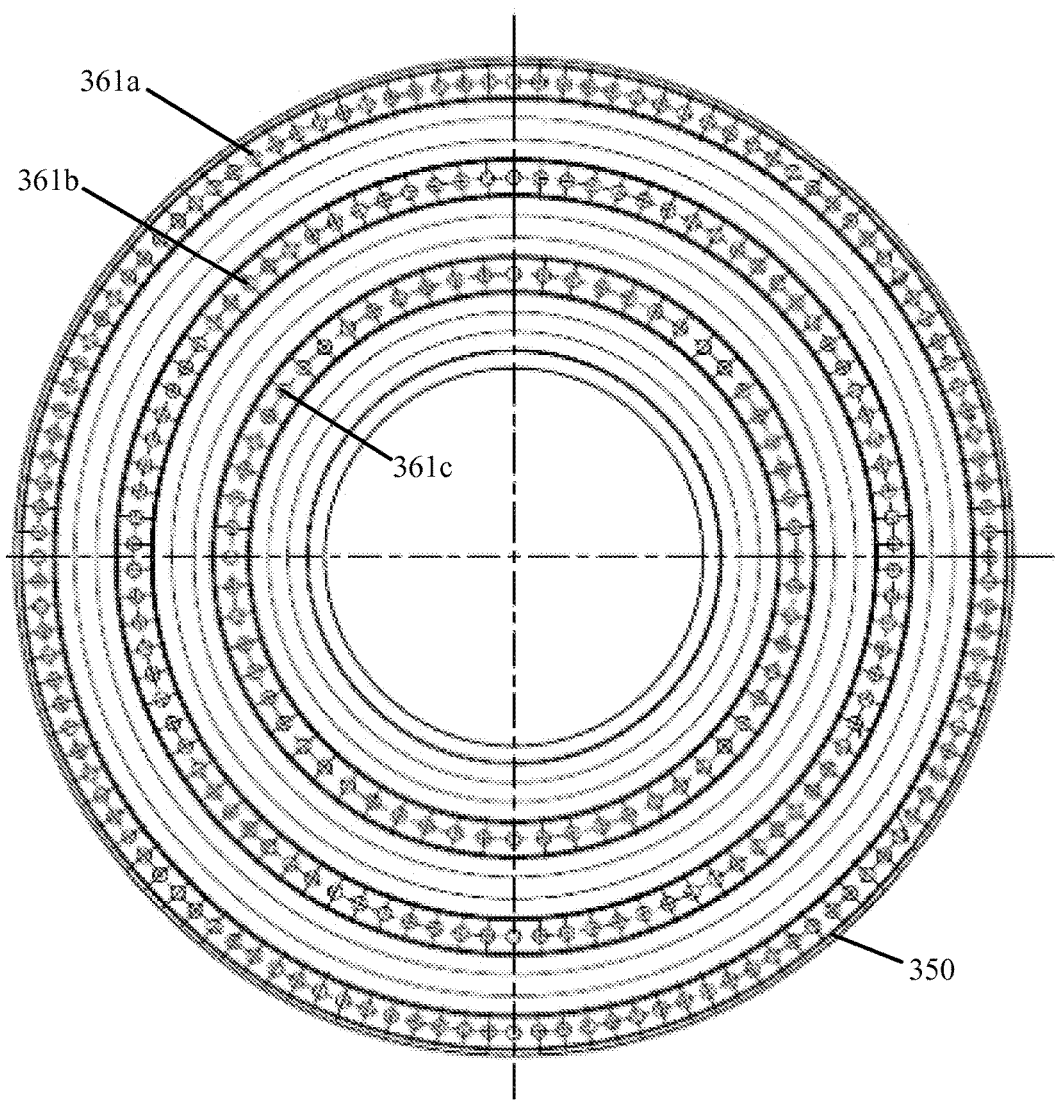
FIG. 27 shows an inlet side of a plate.
Figure 28:
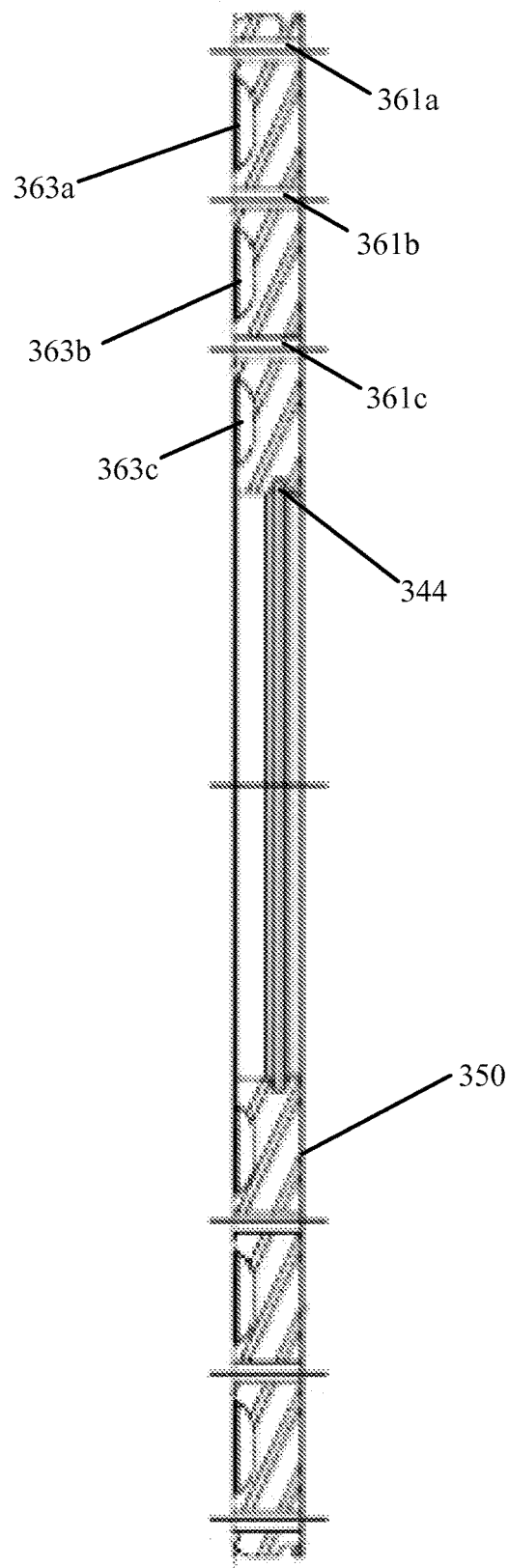
FIG. 28 shows a section of the plate of FIG. 27.
Figure 29:
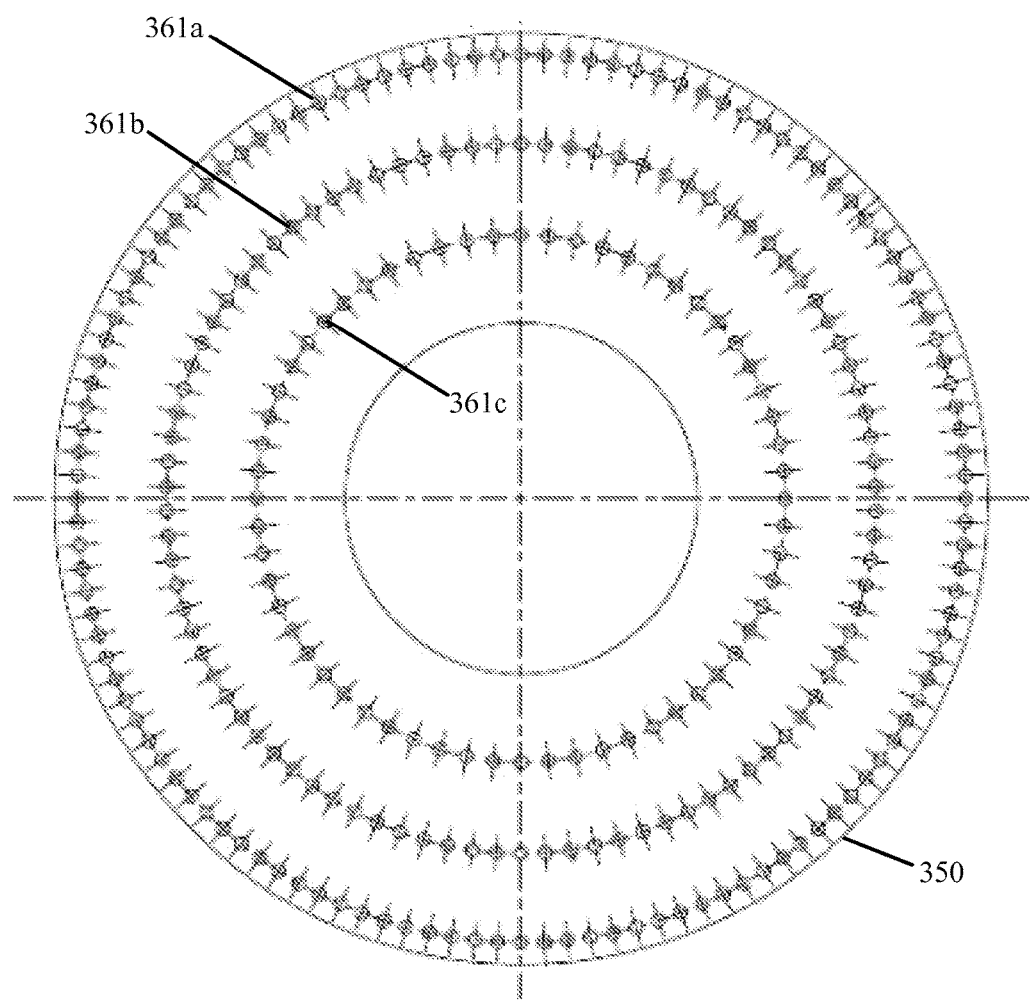
FIG. 29 shows an outlet side of the plate.
Figure 30:
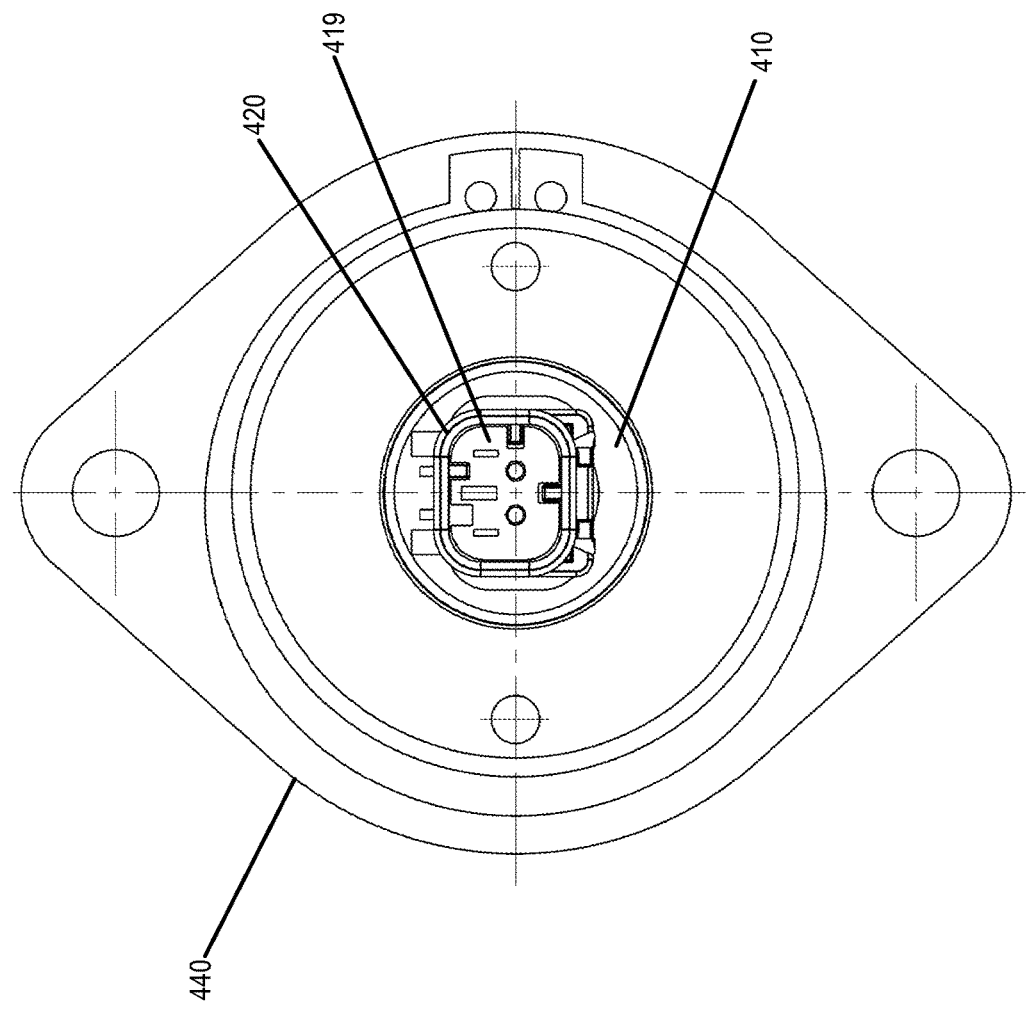
FIG. 30 shows a top view of an injector valve of a fifth embodiment.

Also present within the second bore 301b is a plate 350, and a portion of the valve seat 304. Referring to FIGS. 27-29, the plate 350 may be press fit into the valve seat 304 or may be formed integral with the valve seat 304, such that the plate 350 and the valve seat 304 form one piece. Alternatively, the plate may be attached using other means such as welding or brazing.

The plate 350 has a through bore 344 for receiving the bearing 343. The valve seat 304 also has a bore 335 for receiving the bearing 343. The bore 335 of the valve seat 304 may be lined with a core liner 314, which may be made of polytetrafluoroethylene (PTFE), which is available from DuPont under the trademark Teflon®.

The plate 350 has plate flow holes 361a, 361b, 361c. Fluid flowing through the plate flow holes 361a, 361b, 361c flows out through the valve seat 304 through seat flow outlet 333 to exit the valve. The plate flow holes 361a, 361b, 361c may be blocked by a seal insert 323a, 322b, 323c on the face of the armature 305.

More specifically, seal insert 323a blocks the flow of fluid from inlet passage 301e, inlet flow channel 325, and flow passage 326a to a first plate flow hole 361a, seal insert 323b blocks the flow of fluid from inlet passage 301e, inlet flow channel 325, and flow passage 326b to a second plate flow hole 361b, and seal insert 323c blocks the flow of fluid from inlet passage 301e, inlet flow channel 325, and flow passage 326c to a third plate flow hole 361c.

The first, second, and third set of plate flow holes 361a, 361b, 361c are preferably concentrically arranged relative to the through bore 344 of the plate 350. Wells 363a, 363b, 363c may be present between the plate flow holes 361a, 361b, 361c on the plate 350. In one embodiment, the individual plate flow holes of a first set of plate flow holes 361a are aligned with the plate flow holes of the second and third set 361b, 361c. While the plate flow holes 361a, 361b, 361c are also shown to be the same size, the flow hole size may vary between the first, second and third sets of plate flow holes 361a, 361b, 361c or may vary within the first, second and third sets of plate flow holes 361a, 361b, 361c. Other arrangements of the holes and other geometry than that shown in drawings may also be used.

It should be noted that the pressure force at 100 psid may be approximately 4.24 lbs on the valve seat 304, with the spring load of spring 107 providing the highest percentage of force at 8.5 lbs nominal. The valve stroke is 0.005 nominal.

The armature flow channels 326a, 326b, 326c are in fluid communication with the first, second and third sets of plate flow holes 361a, 361b, 361c, when the solenoid has been energized and the armature 305 has been moved, such that the seal inserts 323a, 323b, 323c no longer block the armature flow channels 326a, 326b, 326c and the first, second and third sets of plate flow holes 361a, 361b, 361c. Additionally, when the solenoid assembly 310 has been energized and the armature 305 has been moved, the inlet line passage 301e is also in communication with the first, second and third sets of plate flow holes 361a, 361b, 361c. The first, second, and third sets of plate flow holes 361a, 361b, 361c provide a large flow capacity within a short stroke, allowing the valve to have actuation time of approximately one millisecond or less.

O-rings may be placed in a notch 334 of the valve seat 304 to reduce leakage. A shim(s) may be present between the valve seat 304 and the third bore 301c of the cartridge body 301 to reduce stroke variation due to tolerance stack up from manufacturing processes which results in lower performance variation and valve to valve variation from high production manufacturing.

When the solenoid assembly 310 is energized, the armature 305 overcomes the force of the spring 307 and inlet pressure from a pressurized source S, and moves towards the solenoid assembly 310, such that the armature 305 moves away from the seat 304. Due to the movement of the armature 305, a flow path is present between the fuel inlet passage 301e to the inlet flow channel 325 and flow passages 326a, 326b, 326c to the plate flow holes 361a, 361b, 361c in the plate 350. From the plate flow holes 361a, 361b, 361c, fluid flows through the valve seat 304 and seat flow outlet 333 to exit the injector valve.

The movement of the armature 305 away from the seat 304 also opens a flow path from the fuel inlet passage 301e directly to the plate flow holes 361a, 361b, 361c of the plate 350. From the first, second, and third plate flow holes 361a, 361b, 361c, fluid flows through the valve seat 304 and seat flow outlet 333 to exit the valve. It should be noted that by allowing fluid to flow through three sets of holes in parallel the flow capacity of the valve is increased within a single stroke of the armature 305. This helps in maintaining the response time of the valve with a high required flow capacity. An orifice may be present on the outlet of the valve to reduce the flow variation further.

When the solenoid assembly 310 is de-energized, the biasing force of the spring 307 returns the armature 305 to its original position. In the armature's 305 original position, the seal inserts 323a, 323b, 323c seal off and block the flow of fluid from the flow passages 326a, 326b, 326c in the armature 305 to the plate flow holes 361a, 361b, 361c in the plate 360 of the valve seat 304 and the seal inserts 323a, 323b, 323c also block off the flow of fluid from the fuel inlet passage 301e directly to the plate flow holes 361a, 361b, 361c.

O-rings 312 and 313 are present on an outer surface of the cartridge body 301 to aid in sealing the valve when mounting the valve to the engine.

Figure 34:
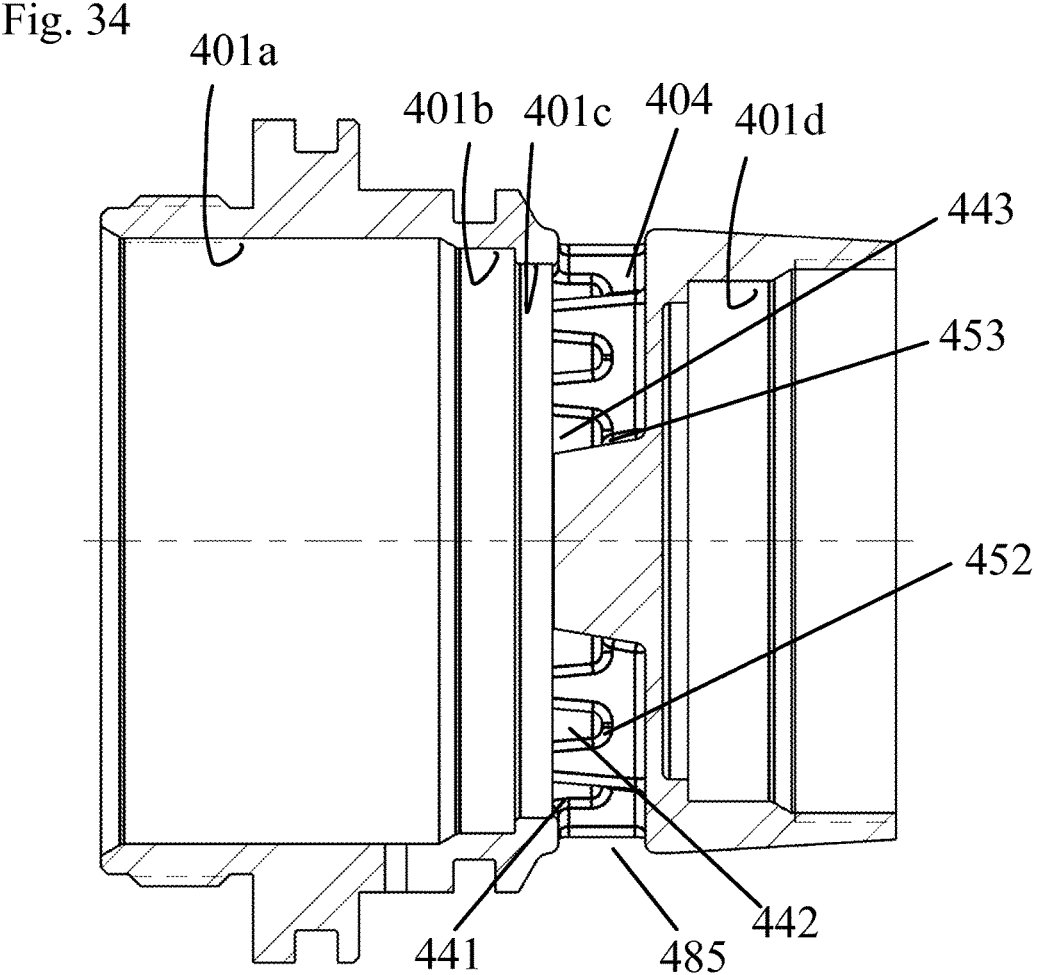
FIG. 34 shows a section view of the outlet of the valve seat of FIG. 33.
Figure 35:
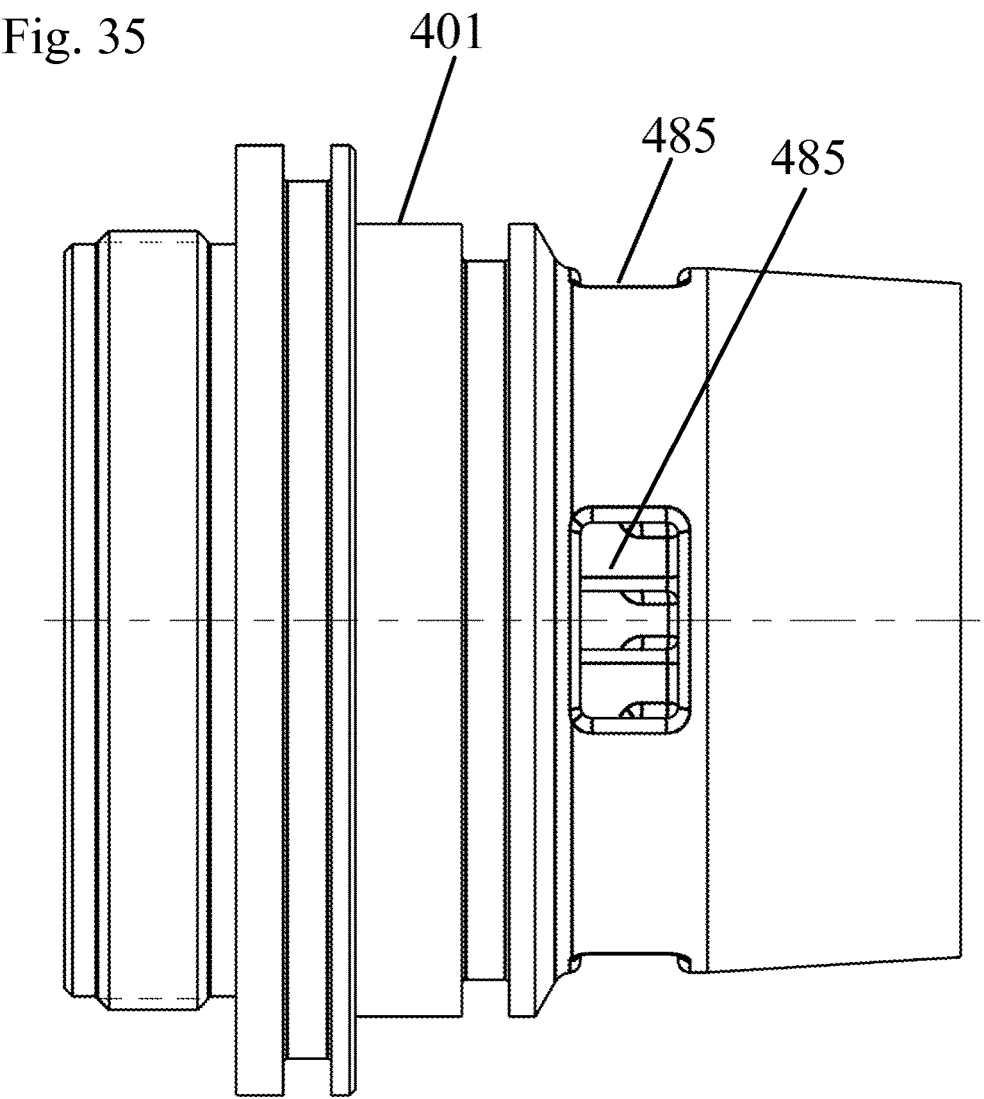
FIG. 35 shows the side view of the valve seat.
Figure 37:
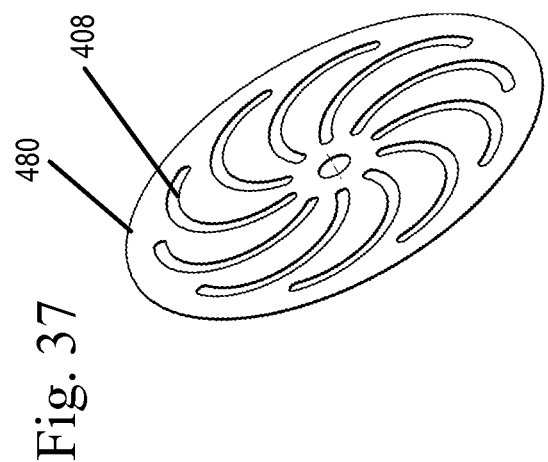
FIG. 37 shows a perspective view of a shim centering disc.
Figure 36:
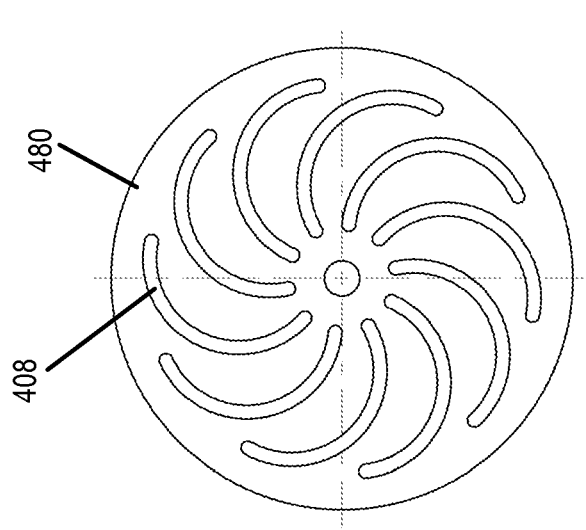
FIG. 36 shows a front view of a shim centering disc.
Figure 38:
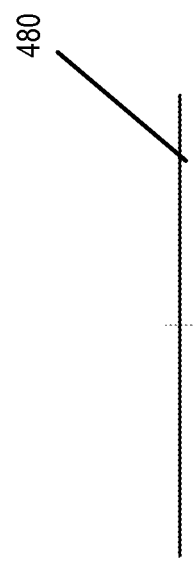
FIG. 38 shows a side view of a shim centering disc.

FIGS. 30-38 show an injector valve of a fifth embodiment of the invention. The injector valve is mounted within the engine using a mounting plate 440 and includes a cartridge body 401 which receives a solenoid assembly 410 and a valve assembly 450. The solenoid assembly 410 has at least one coil 421 connected to a power source (not shown), a bobbin 439 and an armature 405. Between the armature 405 and the core of the solenoid assembly 410 is a shim centering disc 480. The disc 480 is shown in FIGS. 36-38. The shim centering disc 480 has a series of cutouts 408 to allow the disc to have some flex. The valve assembly 450 includes a valve seat 404 with a plurality of notched seat channels 441, 442, 443 which lead to a plurality of flow holes 452, 453. The valve assembly is preferably integral with the cartridge body 401.

Figure 31:
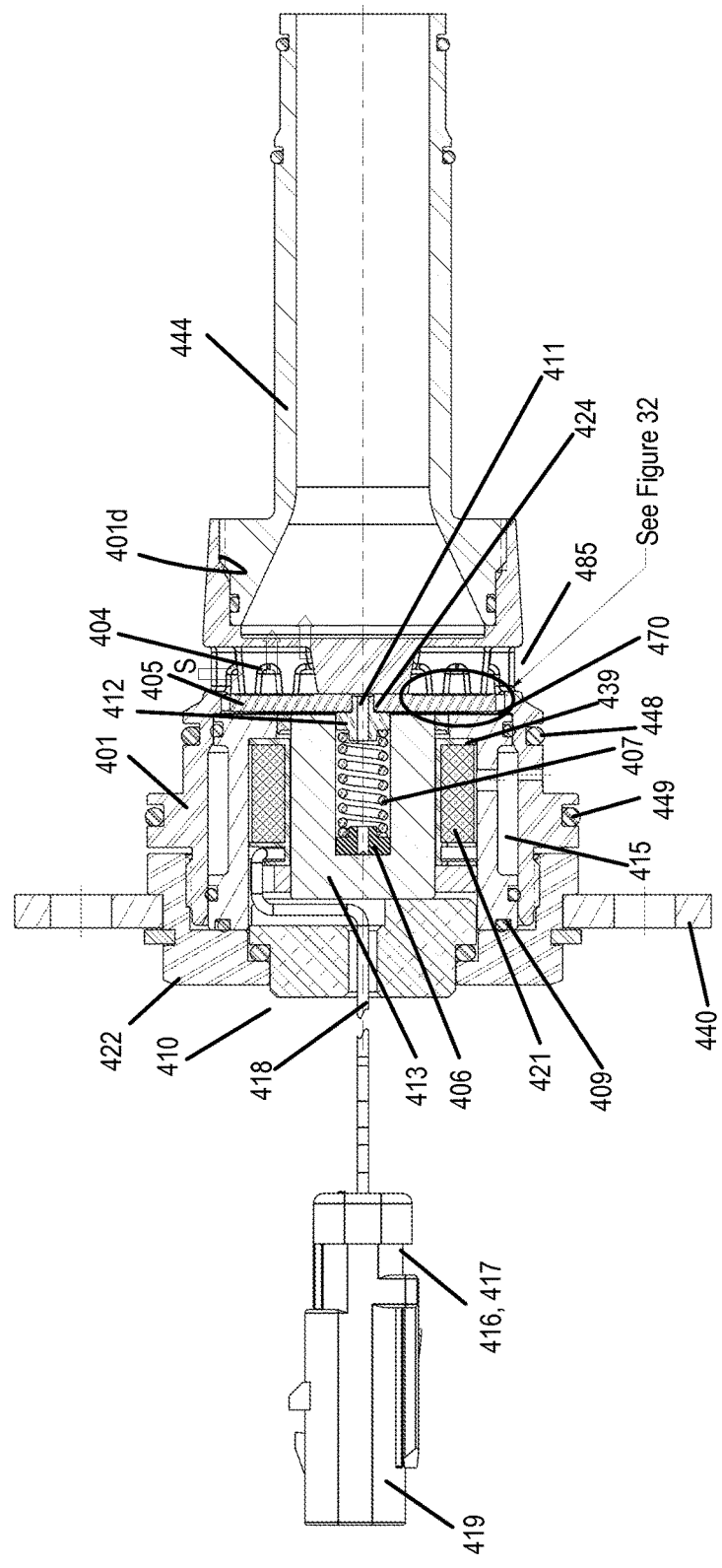
FIG. 31 shows a cut through view of the injector valve of the fifth embodiment.

Referring to FIG. 31, the cartridge body 401 has a first bore 401a, a second bore 401b, and a third bore 401c, a valve seat 404 and an outlet bore 401d. The first bore 401a of the cartridge body 401 receives a tubular casing 438 that surrounds at least one coil 421 of conductive material wrapped around a bobbin 439 and electrically coupled to and energized by an electric or power source (not shown) through electrical conductors 418, a cable seal (not shown), power terminal 416, 417 and connector 419. The connection to the power source may be secured in place by a lock 420. A retainer housing 422 secures the solenoid assembly 410 within the bores 401a-401c of the cartridge body 401.

O-ring seals 409, a tube 415, and the tubular casing 438 seal the solenoid assembly 410 within the bores 401a-401c of the cartridge body 401. A built-in residual air gap 470 is present between the tubular casing 438, the cartridge body 401, and the armature 405.

The armature 405 is preferably formed of a ferromagnetic material and functions as a moving part of the solenoid assembly 410. The armature 405 is subject to flux generated by one or more coils 421 of conductive material wrapped around a bobbin 439 and electrically coupled to an electrical energy source (not shown) through connections. The armature 405 is actuated when the one or more coils 421 are energized by the electrical energy source. The movement of the armature 405 is guided within the third bore 401c of the cartridge body 401. The linear movement of the armature 405 is limited by the valve seat 404 and the solenoid assembly 410. The distance in which the armature 405 can travel is the stroke distance.

A shim centering disc 480 is present between the armature 405 and the tubular casing 438. A center hole 481 of the shim centering disc 480 receives a protrusion 411 of a spring retainer 412. The shim centering disc 480 maintains the armature in a central position of the third bore 401c of the cartridge body 401. The shim centering disc 480 may be slightly magnetic or non-magnetic. The armature 405 has a bore 424 for receiving the protrusion 411 of the spring retainer 412. The other spring retainer 406 is received within a bore of the core 413 of the solenoid assembly 410. Between the spring retainers 406 and 412 is a spring 407.

Figure 32:
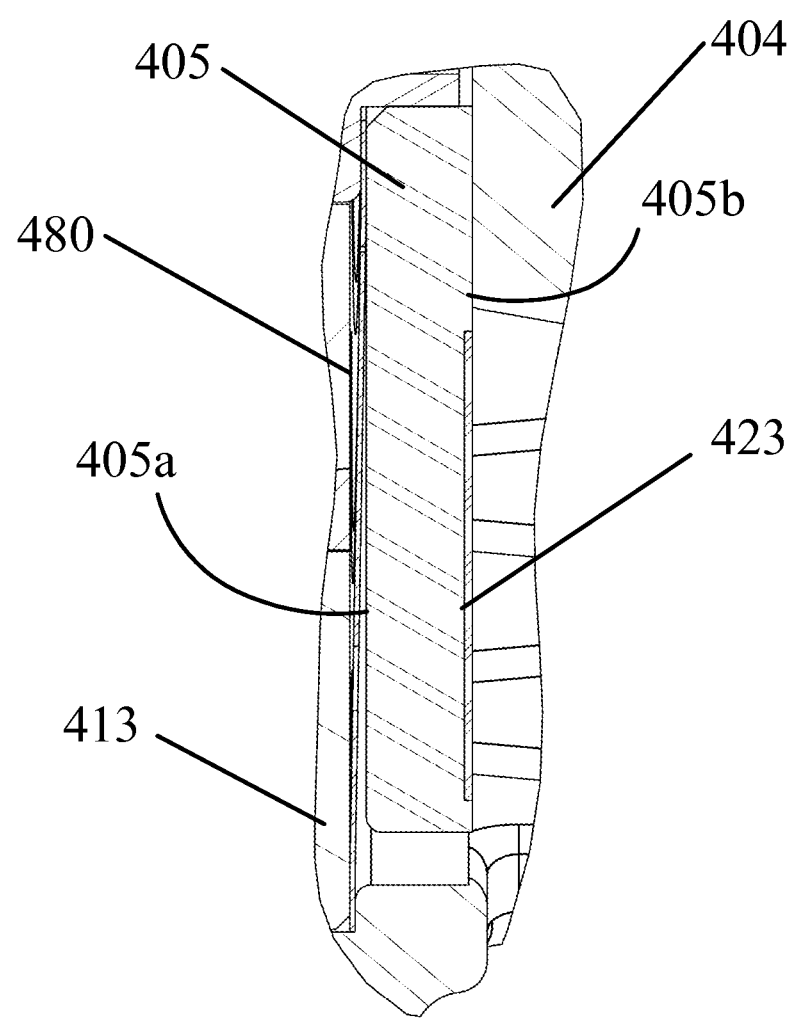
FIG. 32 shows an enlarged view of a portion of the armature and the valve seat.

Referring to FIG. 32, a seal insert 423 is present on a second face 405b of the armature 405 to reduce leakage and block the flow of fluid from an inlet passage 485 in communication with a pressurized supply S to a set flow of notched seat channels 441, 442, 443 and flow holes 452, 453 in the valve seat, when the armature 405 is in a spring biased closed position.

Figure 33:
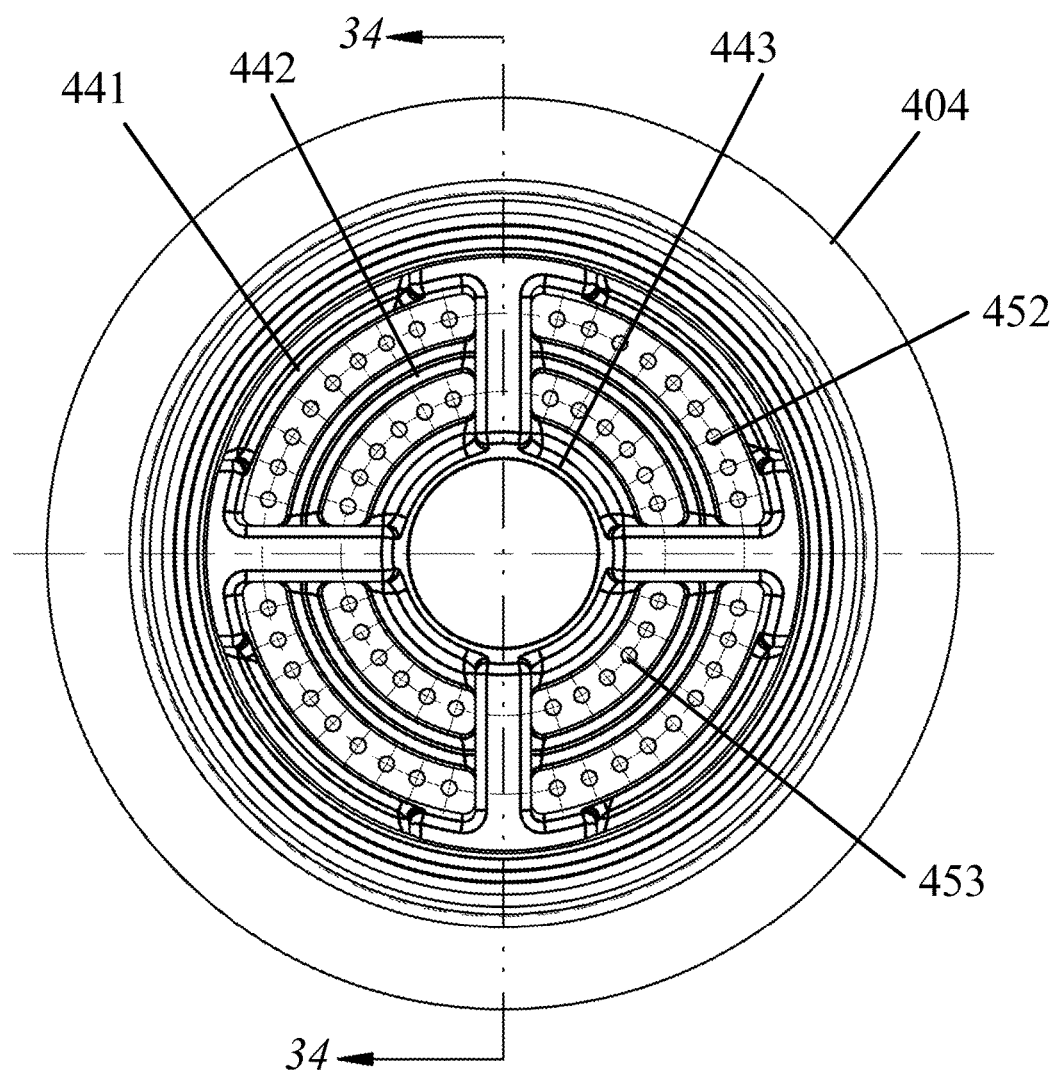
FIG. 33 shows a view of an outlet of the valve seat.

Referring to FIGS. 33-35, the valve seat 404 has an inlet side and an outlet side. The notched seat channels 441, 442, 443 connect the inlet side of the valve seat to the outlet side of the valve seat with flow holes 452, 453. A first notched seat channel 441 connects the inlet side of the valve seat 404 to the outlet side of the valve seat to at least flow holes 452. The second notched seat channel 442 connects the inlet side of the valve seat 404 to at least a first set of flow holes 452 on an outlet side of the valve seat 404. The third notched seat channel 443 connects the inlet side of the valve seat 404 to at least a second set of flow holes 453 on an outlet side of the valve seat 404.

The flow holes 452, 453 are in fluid communication with an outlet 401d of the cartridge body. The outlet 401d of the cartridge body 401 may contain an extension tube 444 as shown in FIG. 31. A venture may be present within the extension tube 444.

The first set and second set of flow holes 452, 453 are preferably arranged around the valve seat 404 in parallel, with the first set of the flow holes 452 offset from the second set of flow holes 453. The first set of holes 452 may be of a different size than the second set of holes 453. Other arrangements of the holes and other geometry than that shown in drawings may also be used.

The notched seat channels 441, 442, 443 present in the valve seat 404 are connected to a supply S, when the solenoid has been energized and the armature 405 has been moved, such that the seal insert 423 no longer blocks the notched seat channels 441, 442, 443. From the notched seat channels 441, 442, 443, fluid can flow to the flow holes 452, 453. The flow holes 452, 453 provide a large flow capacity within a short stroke, allowing the valve to have actuation time of approximately one millisecond or less.

Fluid from a pressurized source S is provided to a fuel inlet passage 485 of the cartridge body 401 and the fluid moves through the passage 485 to the notched seat channels 441, 442, 443 of the valve seat 104. From the notched seat flow channels 441, 442, 443, the fluid flows through the first and second set of flow holes 452, 453 in the valve seat 404, to the outlet 401d of the valve. The fluid may exit the valve through an extension tube 444 and/or an orifice or venturi downstream of the flow holes 452, 453 to provide better flow accuracy.

When the solenoid assembly 410 is energized, the armature 405 overcomes the force of the spring 407 and inlet pressure from a pressurized source S, and moves towards the solenoid assembly 410, such that the armature 405 moves away from the seat 404. A flow path is present between the fuel inlet passage 485 to the notched seat channels 441, 442, 443. Fluid flows from the notched seat channels 441, 442, 443 to the first and second sets of flow holes 452, 453. From the first and second set of flow holes 452, 453 of the valve seat 404, fluid exits the valve through an outlet 401d. It should be noted that by allowing fluid to flow through two sets of holes in parallel the flow capacity of the valve is increased within a single stroke of the armature 405. This helps in maintaining the response time of the valve with a high required flow capacity. An orifice or venturi may be present on the outlet 401d or downstream to reduce the flow variation further.

When the solenoid assembly 410 is de-energized, the biasing force of the spring 407 returns the armature 405 to its original position. In the armature's original position, the seal insert 423 seals off and blocks the flow of fluid from the fuel inlet passage 485 to the notched seat channels 441, 442, 443 of the valve seat and thus to the flow holes 452, 453.

O-rings 448 and 449 are present on an outer surface of the cartridge body 101 to aid in sealing the valve when mounting the valve to the engine.

In all of the above embodiments, the number of holes, arrangement of holes and the size of the holes may vary from what is shown in the drawings. It should be noted that in all of the embodiment, a single seal insert in the armature seals multiple flow holes or passages to multiple flow holes in the valve seat. Seals of the individual flow holes are not necessary.

Accordingly, it is to be understood that the embodiments of the invention herein described are merely illustrative of the application of the principles of the invention. Reference herein to details of the illustrated embodiments is not intended to limit the scope of the claims which will be filed in a utility application claiming benefit from this provisional application, which themselves will recite those features regarded as essential to the invention.

What is claimed is:

1. An injector valve for an engine comprising:
 a cartridge body having a plurality of bores, an outlet and a valve seat between the outlet and the plurality of bores;
 a solenoid assembly received within the plurality of bores of cartridge body comprising:
  a tubular casing received within the cartridge body surrounding at least one coil of conductive material electrically coupled to a power source; and
  a moveable armature received within the cartridge body and subject to flux generated by the at least one coil when powered by the power source, the armature comprising a first face, a second face having a seal insert, and a through hole extending from the first face to the second face;
 a valve assembly received integral with the cartridge body between the plurality of bores for receiving the solenoid assembly and the outlet of the cartridge body comprising:
  the valve seat being coaxial with the moveable armature comprising:
   an inlet side and an outlet side; and
   at least one seat channel extending from the inlet side to at least one first set of flow holes on the outlet side of the body, the at least one seat channel being in fluid communication with circumferential seat flow passages on the inlet side of the valve seat; and
  a spring with a first end retained within the moveable armature and a second end retained within the solenoid assembly, the spring biasing the armature towards the valve seat, such that the second face of the armature with the seal insert seals the at least one seat channel of the valve seat; and
  an inlet passage for fluid communication with a pressurized source of fluid, coupled to the seat channel;
 wherein when the at least one coil is energized by the electrical energy source, the armature moves away from the valve seat within the cartridge body, overcoming a force of the spring, such that fluid from the pressurized source flows through the inlet passage, through the circumferential seat flow passages, and through the at least one seat channel within the valve seat and flows out of the valve seat through the at least one first set of flow holes on the outlet side of the valve seat; and wherein when the at least one coil is de-energized by the electrical energy source, the spring moves the armature to a position in which the seal insert on the second face of the armature contacts the inlet side of the valve seat, sealing the at least one seat channel from communication with the inlet passage.

2. The injector valve of claim 1, further comprising a flexible centering disc between the solenoid assembly and the first face of the armature.

* * * * *